(12) United States Patent
Stewart

(10) Patent No.: US 6,471,229 B2
(45) Date of Patent: Oct. 29, 2002

(54) BICYCLE STEERING DAMPENING APPARATUS AND AN APPARATUS FOR INSTALLING THE SAME

(76) Inventor: Gary L. Stewart, 9721 Adobe Rd., Oak Hills, CA (US) 92345

(*) Notice: Subject to any disclaimer, the term of this patent is extended or adjusted under 35 U.S.C. 154(b) by 0 days.

(21) Appl. No.: 09/825,540

(22) Filed: Apr. 3, 2001

(65) Prior Publication Data

US 2001/0015539 A1 Aug. 23, 2001

Related U.S. Application Data

(63) Continuation-in-part of application No. 09/500,313, filed on Feb. 8, 2000, which is a continuation-in-part of application No. 09/453,346, filed on Dec. 1, 1999.

(51) Int. Cl.$^7$ .................................................. B62K 21/08
(52) U.S. Cl. ........................................ 280/272; 280/279
(58) Field of Search ............................. 280/271, 272, 280/279, 280, 276

(56) References Cited

U.S. PATENT DOCUMENTS

| | | |
|---|---|---|
| 576,566 A | 2/1897 | Foehl |
| 582,279 A | 4/1897 | Gold |
| 608,539 A | 8/1898 | Barto |
| 632,099 A | 8/1899 | Carloni |
| 691,597 A | 1/1902 | Christiansen |
| 940,783 A | 11/1909 | Buckland |
| 1,132,771 A | 3/1915 | Handy |
| 1,230,801 A | 6/1917 | Schriver |
| 1,738,855 A | 12/1929 | Thompson |
| 1,799,806 A | 4/1931 | Thomsen et al. |
| 2,087,535 A | 7/1937 | Dall |
| 2,452,371 A | 10/1948 | Guttormsen |
| 2,511,320 A | 6/1950 | Benson |
| 3,521,904 A | 7/1970 | Sheffer |
| 4,006,915 A | 2/1977 | Parker |
| 4,558,878 A | 12/1985 | Motrenec |
| 4,770,435 A | 9/1988 | Cristie |
| 4,773,514 A | 9/1988 | Gustafsson |
| 4,925,198 A | 5/1990 | Ito et al. |
| 5,492,033 A | 2/1996 | Hopey |
| 5,540,457 A | 7/1996 | Johnson |
| 5,899,478 A | 5/1999 | Woodside |
| 5,927,740 A | 7/1999 | Hopey |

*Primary Examiner*—Anne Marie Boehler
(74) *Attorney, Agent, or Firm*—Henricks, Slavin & Holmes LLP

(57) ABSTRACT

The present invention is directed to stabilizing a bicycle handle from vibration and wobbling while the bicycle is ridden over rough terrain or ridden at high speed. The present invention includes an adapter coupled to the front wheel of the bike. An arcuate rod that is substantially a half-circular rod with two free ends is coupled to the adapter, along the two free ends. The arcuate rod also runs through a dampening cartridge, which stabilizes the bike handle. Furthermore, the dampening cartridge is coupled to the connector via a universal joint along the lowermost frame of the bike. Within the dampening cartridge is a dampening material, and on one end of the cartridge is a cap and on the opposing end is an adjustable nut. Both the cap and the adjustable nut have a concave inner surface facing the dampening material, such that when the adjustable nut is tightened, the dampening material is compressed both radially and axially. As the adjustable nut is further tightened, the dampening material is further compressed causing friction between the arcuate rod and the dampening material to increase. This of course increases the dampening effect upon the arcuate rod to further stabilize the handlebars when vibrating. Furthermore, an expander may be provided to easily and economically install a dampener to a steering tube of a cycle.

61 Claims, 20 Drawing Sheets

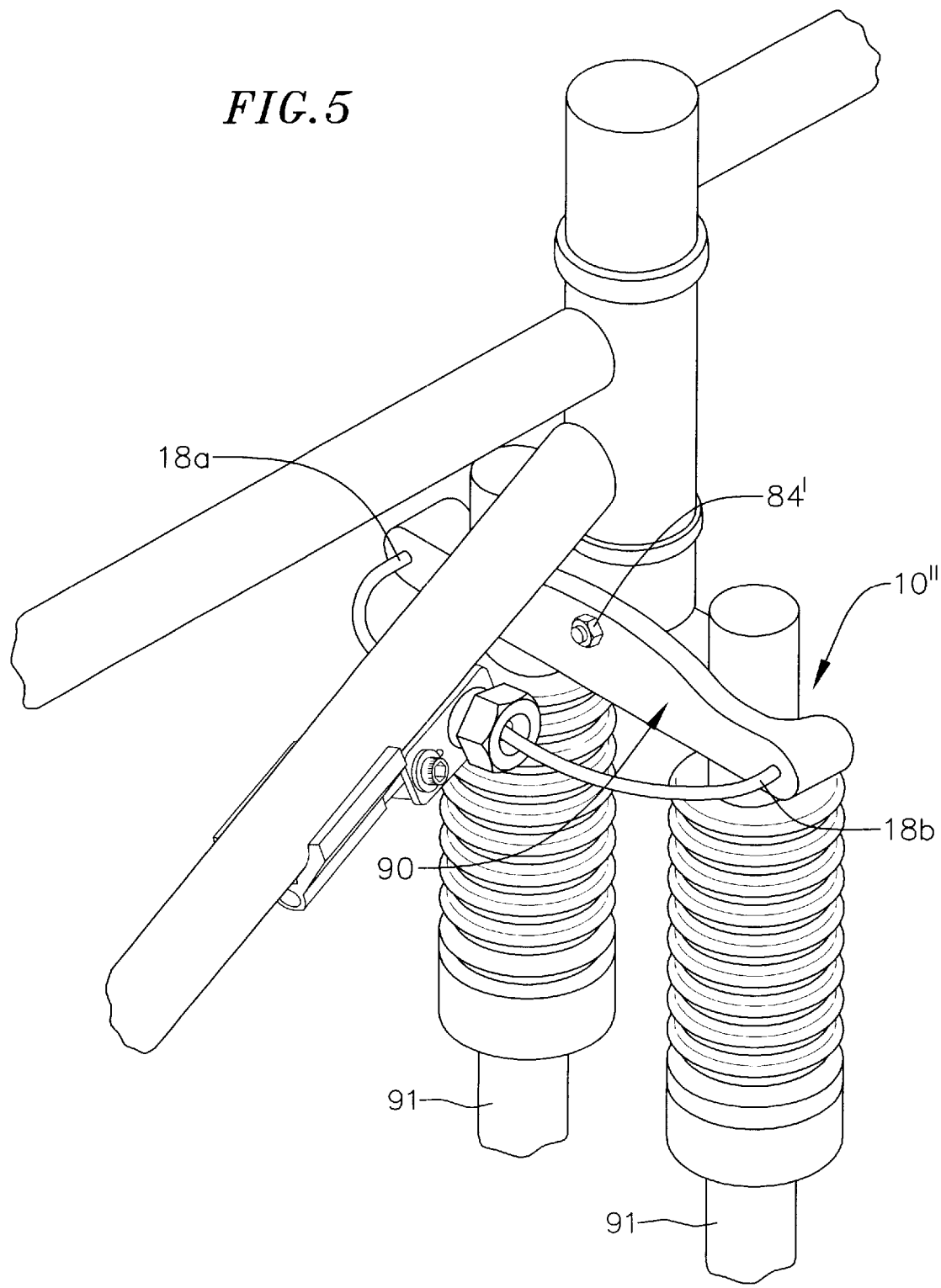

FIG.16A
FIG.16B
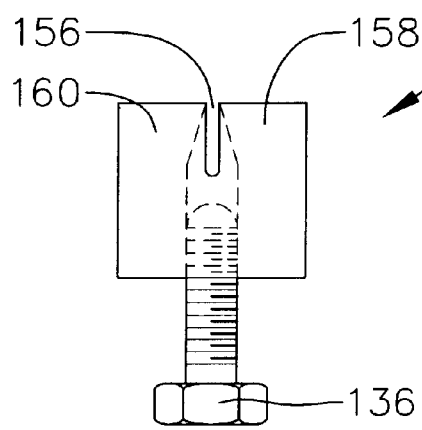
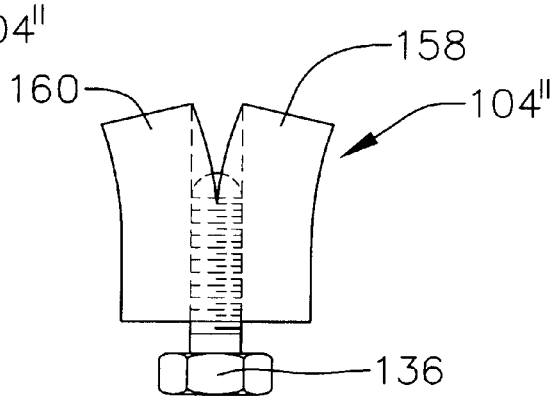

BICYCLE STEERING DAMPENING APPARATUS AND AN APPARATUS FOR INSTALLING THE SAME

This is a Continuation-In-Part of Ser. No. 09/500,313 filed on Feb. 8, 2000, which is a Continuation-In-Part of Ser. No. 09/453,346 filed on Dec. 1, 1999.

BACKGROUND OF THE INVENTION

1. Field of the Invention

This invention relates generally to a vibration dampener and, more particularly, to a vibration dampener for a bicycle steering mechanism and to the methods of using and installing such dampeners.

2. General Background and State of the Art

Today a rider can select from a variety of bicycles to suit individual needs. For example, there are mountain bikes for rough terrain, BMX® bikes for trick rides, and 10-speed bikes for road riding. Furthermore, there have been numerous advances in bicycle technology. For instance, bikes are now lighter but stronger. However, one area that still needs improvement is the steering mechanism of a bicycle. For example, when a mountain bike is ridden over rough terrain, the steering mechanism tends to rattle so that the rider has a difficult time controlling the bike. Further, when a bike is ridden at high speeds down a hill, on a paved road, the steering may be less stable and thus susceptible to being thrown off course by pebbles, rocks, and the like due to the speed of the bike. Foreseeably, loss of control may occur which may ultimately lead to a rider falling off of the bike and an injury occurring.

There have been some attempts to control the steering of the bicycle, but with many shortcomings. For example, U.S. Pat. No. 582,279 issued to Gold is directed to a bicycle controller. This patent discloses a bicycle controller that is attached to the upper tubular member of the bicycle frame. One of the problems with this bicycle controller is that it is placed on the bicycles so that a rider's knee may catch onto the sharp objects of the controller and cut the knee. Further, to install the bicycle controller, numerous holes must be drilled into the handlebar and the upper frame of the bicycle, thereby weakening the integrity of the bicycle frame. Moreover, a number of bicycles today do not have an upper frame, i.e., many bicycles no longer utilize traditional triangular body frames. Rather, a single lower diagonal frame is used to couple the front wheel to the pedal of the bicycle. Thus, the bicycle controller disclosed by Gold could not be installed in bicycles, which do not include an upper frame.

Another attempt is U.S. Pat. No. 576,566 issued to Foehl directed to a straightening attachment for bicycles. Here, when the spring X causes a nose U to engage with a notch S on the yoke D, the front wheel substantially aligns with the back wheel so that the bike will travel in a straight direction. However, the nose can be readily disengaged when a rider turns the fork. Thus, there is no dampening effect by the nose U on the yoke D.

A further attempt is U.S. Pat. No. 940,783 issued to Buckland directed to an equalizing attachment for bicycles. This patent discloses an arc shaped device containing an arc shaped rod 20 around which a spring 22 is attached. The device is designed to attach to any vehicle that has a rotary steering member 1 and the device attaches to the rotating steering member 1. The spring 22 is stationary but the rod 20 rotates in the same direction and along with the steering member 1. As the rod 20 rotates along with the steering member 1, the spring 22 is compressed by the wide end 19 of the rod 20. The resistance from the compressed spring 20 causes the steering member 1 to return to its original position, which is the position at which the spring is completely uncompressed. The purpose of this device is to keep the steering member 1, at a position to maintain the vehicle on a straight course. This device does not assist in maintaining the steady course of a vehicle in any direction. It is limited to assisting in returning the steering member to its original position only.

An attempt similar to Buckland, in concept, is U.S. Pat. No. 5,927,740 issued to Hopey. Hopey discloses a steering damper for vehicles such as bicycles which uses fluid pressure contained within the steering tube of the vehicle to assist the driver in maintaining a straight course. Like Buckland, the goal of the patent is to assist the driver in returning the steering mechanism of the vehicle to the original, straight position. As the steering tube is rotated away from the original, straight position, fluid within the device is displaced from one compartment to another. This displacement of fluid creates pressure in the steering tube such that the pressure is relieved only by returning the steering tube to the original, straight position. Thus, as with Buckland, Hopey does not teach a device for dampening the steering mechanism of the bike from vibration and wobbling while maintaining a steady course in any position.

Another attempt to provide control to the steering mechanism of a vehicle is U.S. Pat. No. 5,540,457 issued to Johnson. This patent discloses a locking nut 62 which is coupled to a sleeve 50 which is mounted to the steering tube 16. The locking nut 62, when tightened, applies pre-load to two sets of bearings 21 upon which the steering mechanism of the vehicle rotates. Increased pre-load to the bearings causes the steering mechanism of the vehicle to become more rigid. This patent only teaches a method for providing more rigidity to the steering mechanism of the vehicle through a device which is attached directly to the steering mechanism of the vehicle. It does not teach a method for dampening vibration and/or wobbling of the steering mechanism.

With the shortcomings discussed above, there is still a need for a dampening mechanism that is out of the way of a rider which may be installed on most bikes, if not all, to dampen the vibration and wobbling of the steering mechanism so that a rider can have better control of the steering at all times to prevent accidents and make the ride more enjoyable.

INVENTION SUMMARY

A general objective of the present invention is to stabilize a bicycle handlebar by reducing vibration and wobbling. That is, when bicycles are ridden in rough terrain or at high speeds, the handlebars of a bicycle tend to wobble or vibrate such that it is difficult for a rider to control the bike. However, with the present invention, much of the vibration and wobbling may be absorbed, thereby stabilizing the handlebars so that a rider can easily control the bike and provide a safer ride.

Another objective of the present invention is being able to couple the present invention to most, if not all, bikes manufactured today.

Yet another objective is to couple the present invention to a bicycle so that it is out of the way of the rider's legs for convenience and comfort.

A further object is to provide a dampener that is adjustable so that the dampening effect may be adjusted.

Still another objective is to provide an expander to easily and economically install a dampener to a steering tube of a cycle.

An additional objective is to provide a dampener that is strong, yet light weight.

In accordance with one aspect of the present invention, these and other objectives are accomplished by providing an adapter coupled to the fork of the bike and an arc-shaped rod ("arcuate rod") attached to the adapter. The arcuate rod extends through a cartridge that is adapted to couple to the lower frame of the bicycle. Within the cartridge is a damping material that is between a cap with and an adjustable nut, each with a hole to allow the arcuate rod to pass therethrough. As the adjustable nut is tightened, the friction between the dampening material and the arcuate rod increases to increase the dampening affect on the rod. Furthermore, the cartridge is contained in a cartridge holder which is coupled to a frame holder, and the frame holder is coupled to the bike. The cartridge holder is coupled to the frame holder by a dowel pin which passes through both the cartridge holder and the frame holder, such that the cartridge holder can adjust to any play in the arcuate rod, while providing added support and stability via its coupling to the frame holder.

In accordance with another aspect of the present invention, the above objectives are accomplished by providing a cartridge having a passage and having a dampening material located within the passage, the dampening material having an axial length and having an opening along its axial length, the cartridge being adapted to be coupled to the lowermost frame of the cycle; and an arcuate rod being adapted to couple to the fork of the cycle, the cartridge being adapted to allow the rod to run through the openings of the dampening material within the cartridge, wherein the dampening material is capable of being adjusted to provide variable resistance to the arcuate rod as the rod runs through the openings of the dampening material.

The method of accomplishing the present invention may also be accomplished by providing an arcuate rod coupled to the fork of a bicycle, a dampener with an adjustable nut and a passage, the arcuate rod running through the passage, wherein within the dampener is a dampening material resisting the movement of the arcuate rod running through the passage of the dampener; adjusting the adjustable nut to compress the dampening material to provide a desired level of friction between the dampening material and the arcuate rod; and coupling the dampener to the lowermost frame of the bicycle.

Yet another apparatus for accomplishing the present invention may be done by providing an expander having a bore; a driver adapted to engage into the bore of the expander between first and second positions; and the expander coupled to a bicycle dampening steering apparatus and adapted to protrude into a bicycle steering tube in the first position of the driver; wherein in the second position of the driver the expander expands to engage with the bicycle steering tube to couple the bicycle dampening steering apparatus to the bicycle steering tube.

In another alternative embodiment, in order to further the objective of the present invention of having a stronger dampener, the frame holder may be rigid and the cartridge holder may be positioned between two long flanges that extend out from the frame holder, and the cartridge holder may be joined to the frame holder by a dowel pin. Further, the opening in the cartridge holder where the dowel-pin is inserted may be elongated to allow the cartridge holder to move up and down and/or slide backwards and forwards to accommodate and compliment the movements of the fork of the bicycle. While the frame holder and cartridge holder are designed with the objective of strengthening those parts, the design details are intended to lighten the weight of those component parts in the following manner. The frame holder has substantially a triangular shaped cut out section on each side of the portion that is intended to couple to the frame of the bicycle to reduce unnecessary weight for that component. Likewise, the cartridge holder has an elongated cut out section on the top and bottom walls of the cartridge holder, above and below the elongated side openings through which the dowel-pin is inserted. These cut out sections in the cartridge holder are also intended to reduce the weight of that component.

To accomplish the objective of minimizing size, weight and complexity of the cartridge while maintaining strength and performance, the number of component parts of the cartridge may be minimized to two (2) elements and the size and design are such that the cartridge itself need not be curved to accommodate the curved arcuate rod which passes through it.

The above described and many other features and attendant advantages of the present invention will become apparent from a consideration of the following detailed description when considered in conjunction with the accompanying drawings.

BRIEF DESCRIPTION OF THE DRAWINGS

A detailed description of the preferred embodiment of the present invention will be made with reference to the accompanying drawings.

FIG. 2B is a perspective view of the triple clamp according to FIG. 2a;

FIG. 5 is a perspective view of yet another embodiment of the dampening apparatus coupled to the fork in the lowermost body frame of a cycle with a slightly wider fork;

FIG. 13a is an exemplary top view of the exemplary expander in accordance with FIG. 12a;

FIG. 14a is an another exemplary top view of the exemplary expander in accordance with FIG. 12a;

FIG. 15a is yet an another exemplary top view of the exemplary expander in accordance with FIG. 12a;

FIG. 16a is another exemplary side view of the exemplary expander in accordance with FIG. 12a in an unlocked position;

FIG. 16b is another exemplary side view of the exemplary expander in accordance with FIG. 12b in a locked position;

DETAILED DESCRIPTION OF THE PREFERRED EMBODIMENTS

The present invention is directed to stabilizing a bicycle handlebar from vibration and wobbling while the bicycle is ridden over rough terrain or ridden at high speed. By way of example, the above objects are accomplished by providing an arcuate rod that is coupled to the fork of the cycle and also runs through an adjustable dampening cartridge. The cartridge is coupled to the lowermost frame of the bike. The coupling of the cartridge to the lowermost frame of the bike provides additional stability to the steering mechanism of the bike by providing additional support for the mechanism. Within the dampening cartridge is a dampening material, and on one end of the cartridge is a cap and on the opposing end is an adjustable nut. Both the cap and the adjustable nut have a concave inner surface facing the dampening material, such that when the adjustable nut is tightened, the dampening material is compressed both radially and axially. As the adjustable nut is further tightened, the dampening material is further compressed causing friction between the arcuate rod and the dampening material to increase. This of course increases the dampening effect upon the arcuate rod to further stabilize the handlebars when vibrating.

Figure 1:
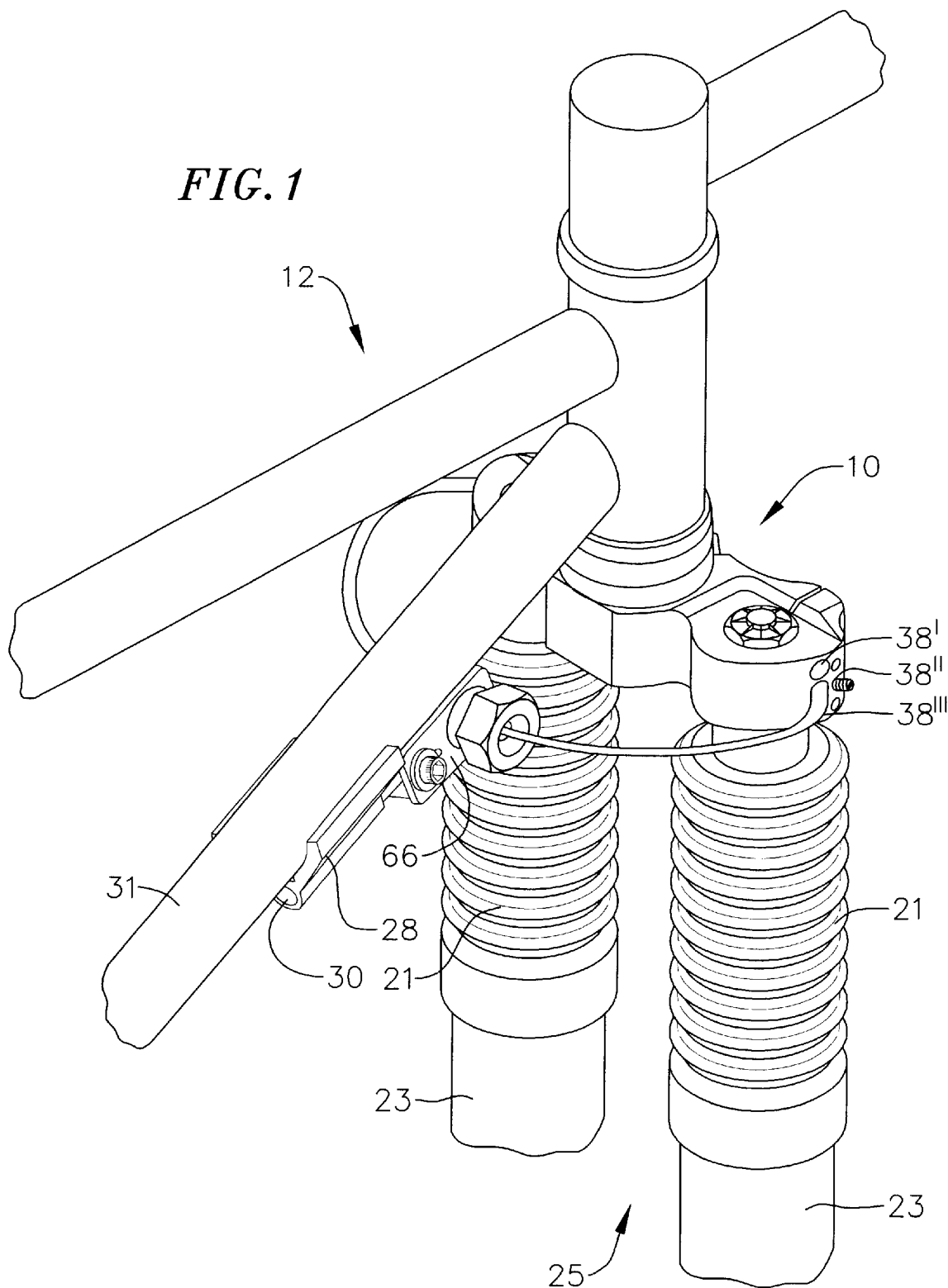
FIG. 1 is a perspective view of an exemplary dampening apparatus coupled to a mountain bike in accordance with the present invention.
Figure 2:
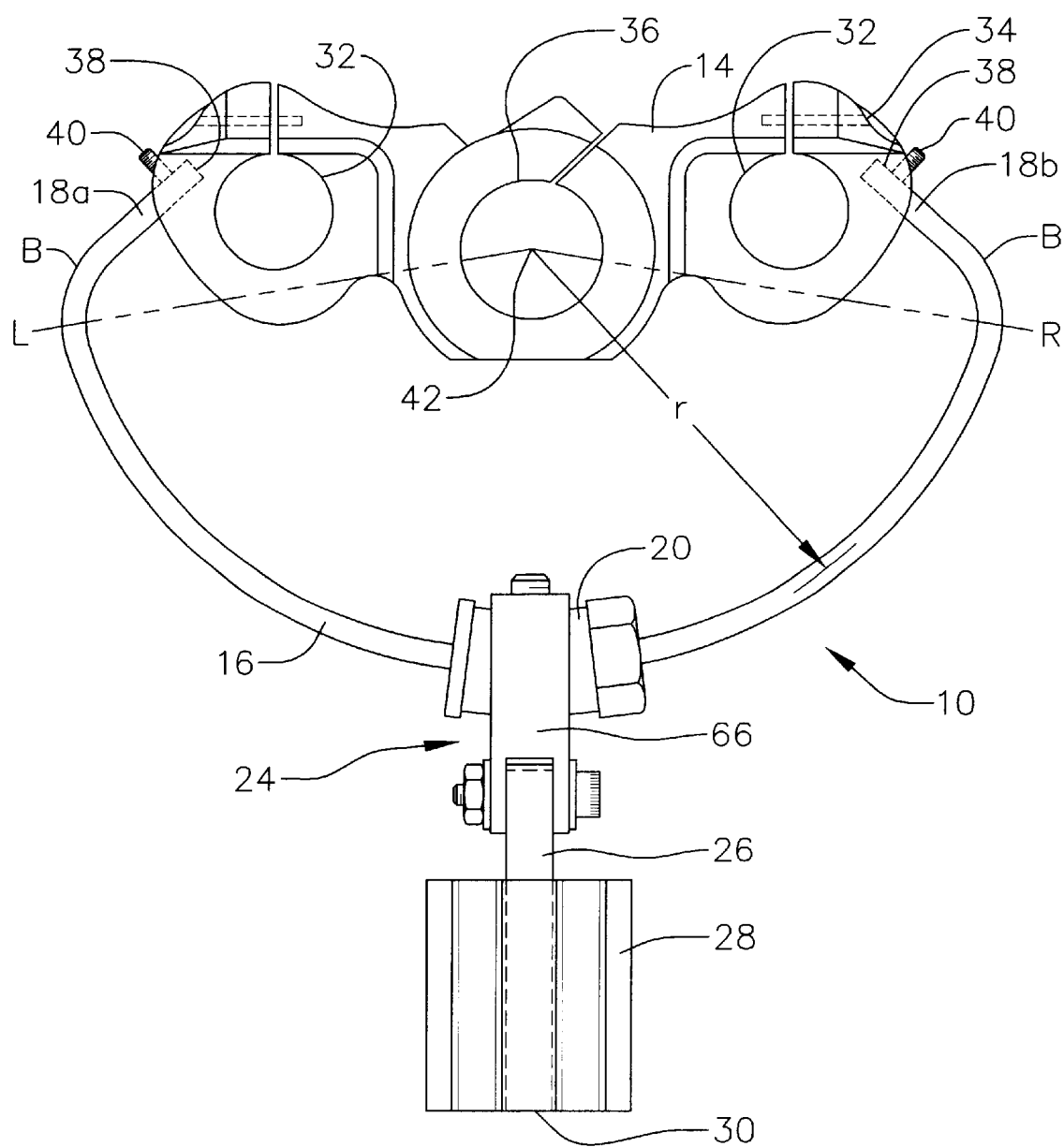
FIG. 2 is a top view of the exemplary dampening device according to FIG. 1.
Figure 3:
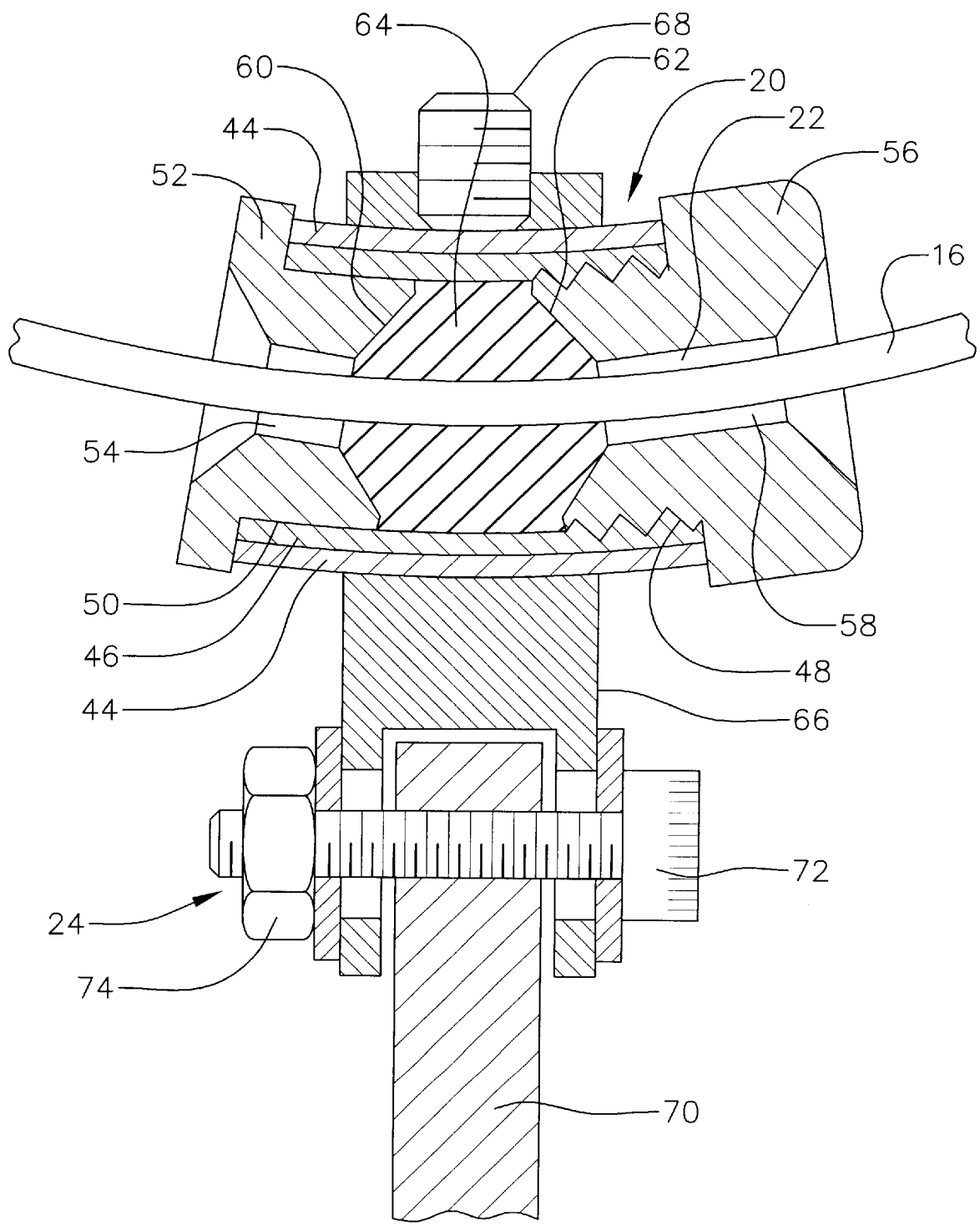
FIG. 3 is a cross-sectional view of an arcuate rod passing through a cartridge coupled to a universal joint of the exemplary dampening apparatus assembly according to FIG. 2.

As illustrated by way of example in FIGS. 1 through 3, an exemplary dampening apparatus assembly 10 is coupled to a mountain bike 12. As shown in FIG. 2, the dampening apparatus assembly 10 includes a triple clamp 14, an arcuate rod 16 with two free ends 18a and 18b which are coupled to the triple clamp 14, an adjustable dampening cartridge 20 which has a passage 22 therethrough to allow the arcuate rod 16 to run through, a universal joint 24 coupled to the cartridge 20 which includes a pivot arm 26, and a connector 28 with a port 30 therethrough which is axially coupled to the universal joint 24 via the pivot arm 26 releasably associated with the port 30 of the connector 28.

By way of background, mountain bikes with front wheel shock absorbers are provided with a triple clamp to mount the front wheel shock absorbers to the handlebars of the bike. Like the triple clamp shown in FIGS. 1 and 2, a pair of front wheel shock absorbers 21, which makes up the upper portions of parallel forks 23, are coupled to the triple clamp 14 via a pair of clamp openings 32. That is, free ends of the shock absorbers are inserted into their respective clamp openings and are clamped together by a screw 34. In this embodiment, the assembly of the triple clamp 14 and parallel forks 23 makes up the lower steering assembly 25. Furthermore, a shaft (not shown) is press-fitted into a rotating axis opening 36 to couple the triple clamp 14 to the handlebars of the bike. Although described with respect to a mountain bike herein, the present invention may be used equally well with any other type of bicycle or the like.

To couple the arcuate rod 16 to the fork of a bike, the triple clamp and the shaft assembly originally provided with a mountain bike may be removed and replaced with the triple clamp 14 which is adapted to receive the arcuate rod 16. In this regard, the triple clamp 14 has a pair of bore openings 38 to receive the free ends 18a and 18b of the arcuate rod. To hold the arcuate rod 16 in place, a screw 40 is used in each of the bore openings 38 to press the respective free ends against the interior surface wall of the bore opening. Furthermore, as shown in FIG. 1, there are at least two pairs of bore openings displaced vertically on the side of the triple clamp 14 so that a user can adjust the position of the arcuate rod 16 vertically depending upon the angle and the placement of the lowermost frame 31 of the cycle. That is, the arcuate rod 16 may be secured to the triple clamp 14 along any number of the pair of bore openings, such as 38', 38", and 38''', to adjust the vertical placement of the arcuate rod 16 depending on the particular placement of the lowermost frame 31 of the cycle. Alternatively, the dampening apparatus assembly 10 may be provided with the bicycle when it is purchased.

Figure 2A:
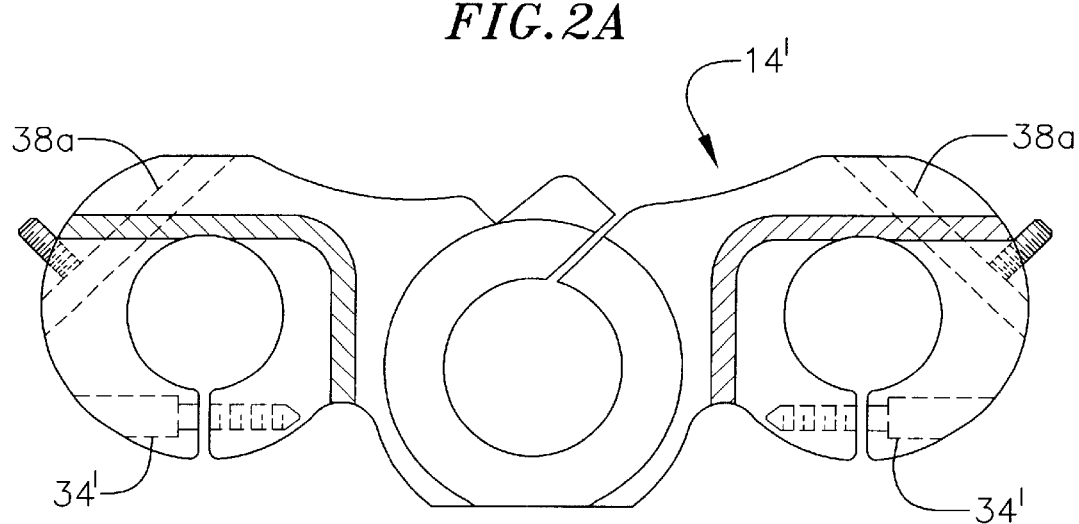
FIG. 2A is a top view of another embodiment of the present invention having a triple clamp to adapt to a mountain bike.
Figure 2B:
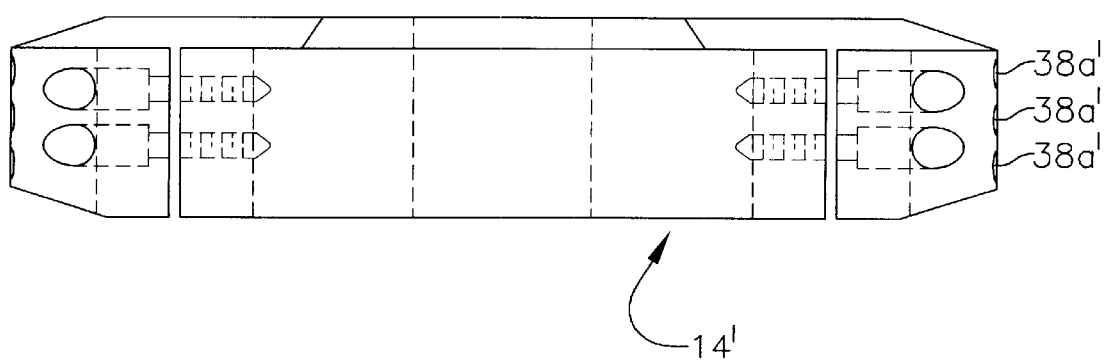

FIG. 2A illustrates another embodiment of the triple clamp 14'. In this embodiment, the position of the screw 34' has been moved from the front side to the backside of the triple clamp 14'. Accordingly, the front side of the triple clamp 14' is free of threaded openings thereby allowing a pair of bore openings 38a to run diagonally through the triple clamp 14'. This allows more surface area between the free ends of the arcuate rod 16 and the interior surfaces of the bore openings to be in contact so that the arcuate rod 16 is securely held within the bore opening. Also, as shown in FIG. 2B, at least two pairs of bore openings are displaced vertically to allow the placement of the arcuate rod 16 to be adjusted vertically, if necessary.

As shown by way of example in FIG. 2, the arcuate rod 16 is a substantially half-circular rod with a substantially constant radius r about the rotating axis 42 between positions L and R. Preferably, the angle between positions L and R is substantially 180°. This means that a rider can rotate the handlebars about the rotating axis 42 substantially 90° to the left and 90° to the right. Radius r may be greater than the distance between the rotating axis 42 and the pair of bore openings 38 to maximize the circumference and minimize the arc between the positions L and R. Minimizing the arc of the rod 16 so that it is more straight allows the cartridge 20 to dampen the arcuate rod 16 more effectively. As such, to couple the free ends 18a and 18b to the pair of bore openings 38, respectively, each of the free ends 18a and 18b are bent inwardly along point B as shown in FIG. 2. Dimensionally, radius r may vary approximately between 3½ to 4 inches, with a preferred radius of 3¾ inch. The diameter of the arcuate rod 16 may vary approximately between ⅛- to ⅜-inch with a preferred diameter of 3/16-inch. Other dimensions may be used in accordance with the present invention.

Figure 2C:
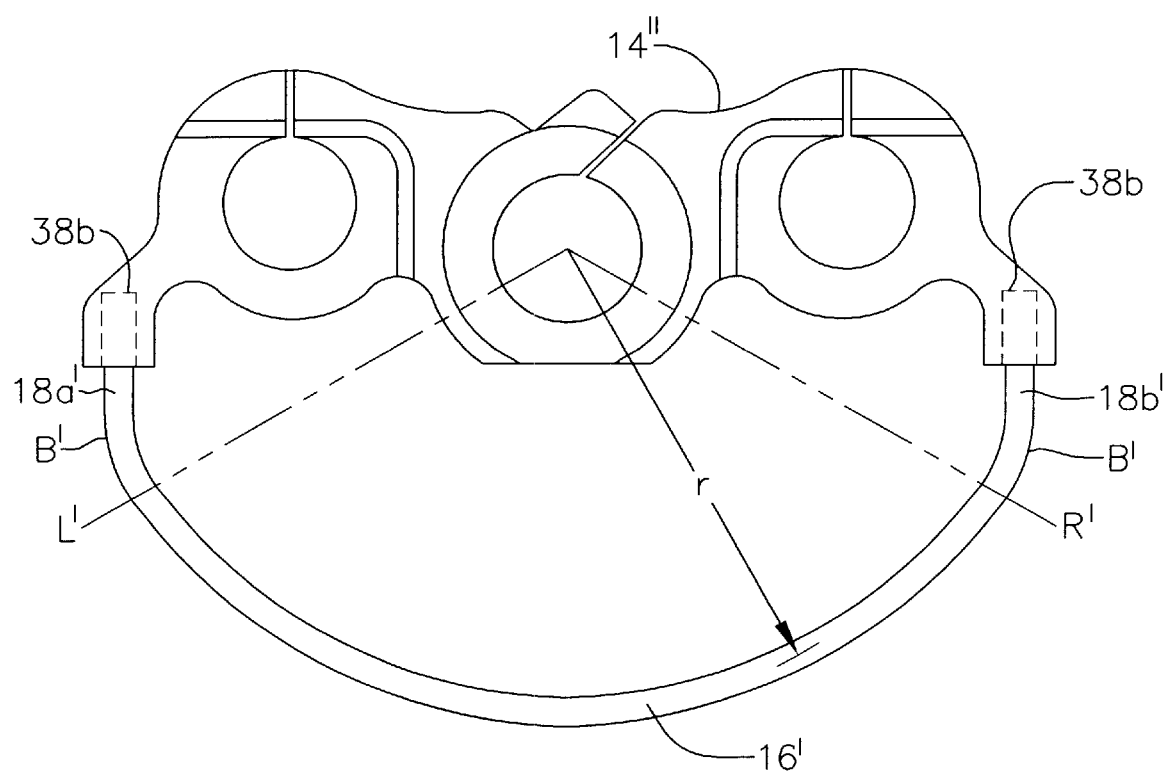
FIG. 2C is a top view of yet another embodiment of the present invention showing a triple clamp and arcuate rod combination.

FIG. 2C illustrates by way of example yet another embodiment of the triple clamp 14". In this embodiment, the pair of bore openings 38b are parallel to each other. Accordingly, an arcuate rod 16' has a slight bend along point B' to allow the free ends 18a' and 18b' to associate with the pair of bore openings 38b. However, in this embodiment, the degree of rotation between L' and R' is less than the degree of rotation between L and R, as shown in FIG. 2.

With regard to the cartridge 20, as illustrated by way of example in FIG. 3, the cartridge 20 has a shell 44, which is curved to substantially match the arc of the arcuate rod 16. The curved shape in the shell 44 allows the arcuate rod 16 to run through the passage 22 without unintentional binding on the arcuate rod 16. Within the shell 44 is an inner wall 46 with a threaded opening 48 on one end and a non-threaded opening 50 on the opposite end. At the non-threaded opening 50, a cap 52 with a hole 54 is press-fit thereto. At the threaded opening 48, an adjustable nut 56 with a hole 58 is mated with the threaded opening 48. Preferably, the inner faces 60 and 62 of both cap and adjustable nut, respectively, are concave facing one another. Between the cap 52 and the adjustable nut 56 is a dampening material 64 which may be initially formed from a flat rectangular shape rolled to fit within the inner wall 46. Once the dampening material 64 is inserted into the inner wall, the dampening material 64 forms a cylindrical shape with two flat ends (not shown). Accordingly, the passage 22 is comprised of the holes 54, 58 and the opening center of the rolled up dampening material 64.

As the adjustable nut 56 is rotated to tighten the dampening material 64, the concave faces between the cap 52 and the adjustable nut 56 compress the dampening material 64 both radially and axially. In other words, the dampening material 64 is axially compressed because the two inner faces 60 and 62 come closer together as the adjustable nut 56 is tightened. At the same time, the dampening material 64 is radially compressed as the concave faces on the cap 52 and the adjustable nut 56 apply downward forces toward the arcuate rod 16 to radially compress the dampening material 64. Thus, the concave faces exert both radial and axial forces on the dampening material 64. As the adjustable nut 56 is further tightened, the dampening material 64 is further compressed to cause the friction between the arcuate rod 16 and the dampening material 64 to increase. This, of course, increases the dampening effect on the arcuate rod 16. In other words, a rider can adjust the dampening effect by simply adjusting the adjustable nut 56.

Alternatively, although not shown, it is within the scope of the present invention to have a shell that is not curved, in other words, a straight tubular member. Furthermore, a second adjustable nut may be provided in place of the cap 52 so that a rider can further adjust the cartridge. However, there are a number of advantages to having a cap that is press-fit into the cartridge. For example, press fitting eliminates the need for threading the inner wall 46 and minimizes the sharp edges that may be formed on the threaded nut versus a rounded cap.

Preferably, the dampening material is made from any high-density cell structure that wears well. The high-density cell structure provides numerous contact areas, but not 100% contact on the arcuate rod. This minimizes the heat that is created due to the friction that is created between the dampening material and the arcuate rod. Furthermore, there is less build-up of the dampening material residue created from the arcuate rod bearing on the dampening material because it is not in 100% contact. However, as more pressure is applied from the adjustable nut, the cell structure closes down which puts more pressure on the arcuate rod, so it puts more dampening to the steering of the cycle. Yet, the arcuate rod flows freely because the cell structure is not in 100% contact with the arcuate rod. As the adjustable nut is loosened, the cell structure returns to its original form to release the pressure off of the arcuate rod. One such preferred material is a urethane, A40 or A45 grade. However, any other material with similar qualities to those that are described above that is known to one of ordinary skill in the art is within the scope of the present invention.

Universal joint 24, as shown in FIGS. 1, 2, 3, 4 and 5, includes a body portion 66, which wraps around the shell 44 of the cartridge 20. On one end of the body portion 66 is a screw 68 to tighten the body portion 66 onto the shell 44 of the cartridge 20. At the other end of the body portion 66 is an arm 26 pivotally coupled to the bottom portion via a bolt 72 and nut 74 combination. The pivot arm 26 is preferably a circular rod with a diameter approximately between ¼- and ½-inch with a preferred diameter of ⅜-inch. Other dimensions may be used in accordance with the present invention.

As shown in FIG. 2, the pivot arm 26 of the universal joint 24 is releasably. inserted into the port 30 of the connector 28. As such, the pivot arm 26 may axially move relative to the connector 28. To couple the connector 28 to the lowermost frame of the cycle, a strap (not shown) may be used, as may any other method known to one of ordinary skill in the art. One of the advantages in coupling the dampening apparatus assembly 10 to the lowermost frame of a cycle is that it is out of the way of the rider's legs so that it does not accidentally cut the rider. Yet another advantage is that it is adaptable to most, if not all, bikes because every bike must have at least a lowermost diagonal frame to couple the front wheel to the pedal of the bike.

Once the dampening apparatus assembly 10 is installed on a mountain bike, for example, even when the bike is ridden over rough terrain, much of the vibration is absorbed to stabilize the handlebars so that a rider can easily control his bike. Furthermore, the degree of dampening can be adjusted by further tightening or loosening the adjustable nut. Additionally, the universal joint adjusts to any lateral, side-to-side, and/or vertical movement of the arcuate rod, which may be caused by the vibration. That is, pivot arm 70 adjusts to any lateral movement by axially moving within the port 30, and adjusts to any vertical movement through the pivot point along the bolt 72, and any side-to-side movement is of course absorbed by the dampening material.

With regard to installation, the triple clamp originally provided with the mountain bike is first removed and is replaced with triple clamp 14. The pair of shock absorbers are then inserted into their respective pair of clamp openings 32, and secured in place by tightening the screw 34. Thereafter, based on the location of the lowermost frame and the degree of angle, the arcuate rod 16 is coupled to the triple clamp along any one of the pair of bore openings 38', 38", and 38'". The pair of bore openings should be selected to allow the body portion of the universal joint 24 to slide axially relative to the lowermost frame of the cycle.

Next, to ensure that the passage 22 of the cartridge 20 is in sync with the arc of the arcuate rod 16, the screw 68 is loosened and the cartridge 20 adjusted so that the curvature of the shell 44 is in parallel with the level plane of the arcuate rod 16. To facilitate adjusting the cartridge so that it is in sync with the arc of the arcuate rod, a color line may be drawn onto the cartridge to indicate the centerline of the curve formed on the cartridge. Thus, if the center line is not parallel to the arc of the rod, the cartridge is rotated until the center line is on a level plane with the arc of the rod then locked down by tightening the screw 68. Once the cartridge is adjusted, the pivot arm 26 is adjusted until it is parallel to the lowermost frame of the bike and inserted into the port 30 of the connector 28 until the bottom end of the arm 70 is flush with the bottom end of the port 30. When the bottom end of the arm 70 is flush against the port 30, the connector 28 is secured to the lowermost frame of the cycle.

Figure 4A:
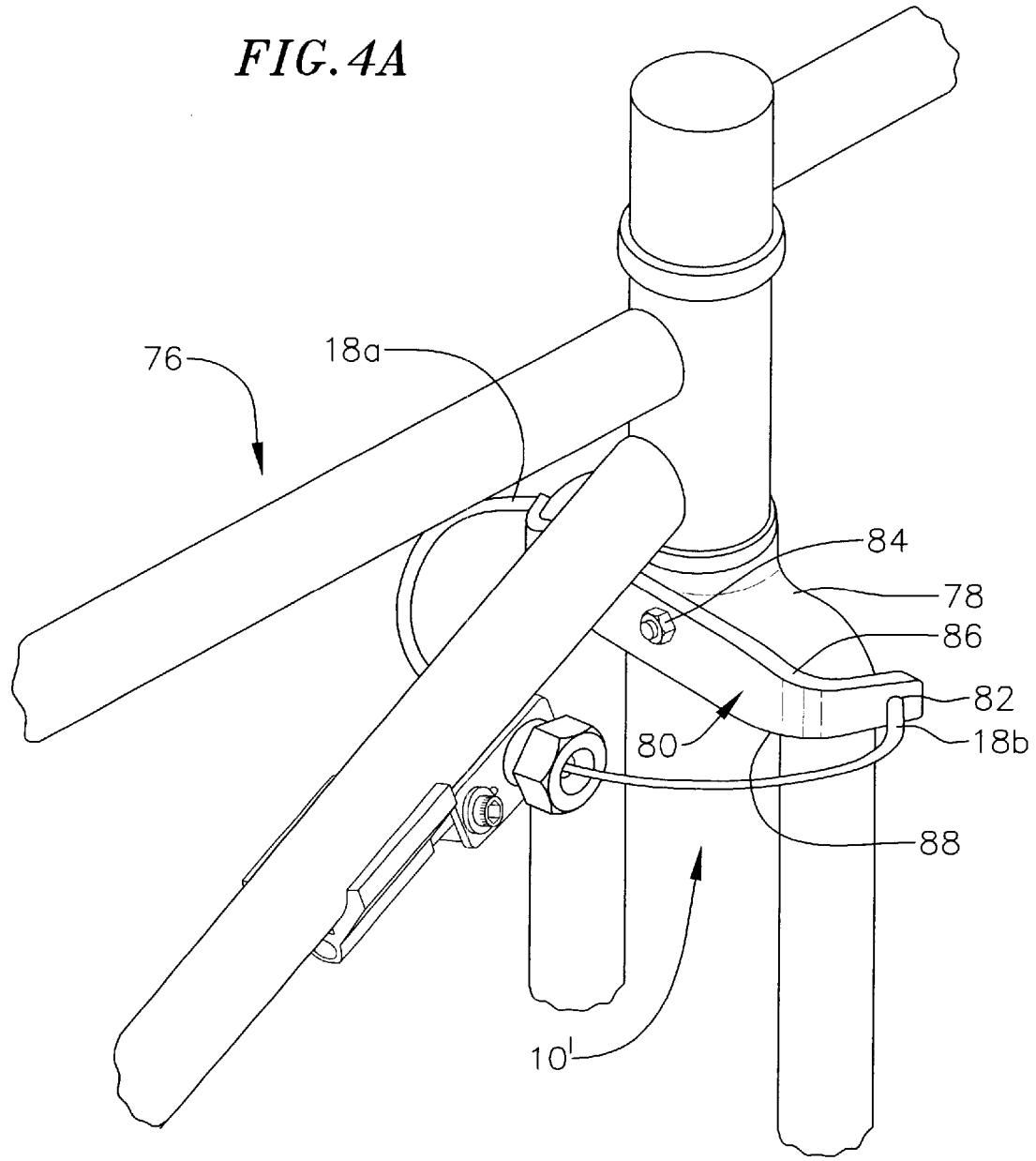
FIG. 4a is a perspective view of another embodiment of the dampening apparatus coupled to the fork and the lowermost body frame of a cycle.

FIG. 4a by way of example illustrates yet another embodiment of the dampening apparatus assembly 10'. Here, the dampening apparatus assembly 10' is adapted to couple to a road bike, such as a BMX bike. By way of background, road bikes such as the road bike 76 shown in FIG. 4a, are provided with a fork (lower steering mechanism) 78, rather than a triple clamp as shown in FIG. 1 for a mountain bike with shock absorbers. Furthermore, most road bikes, if not all, have a quarter-inch hole at the top center of the fork just below the stem. These quarter-inch holes are standardized to mount the front brake or front reflectors, for example. Note that in this embodiment, the lower steering mechanism is the fork 78.

As such, for road bikes, an adapter 80 is used to couple the arcuate rod to the fork of the bike. As shown by way of example in FIG. 4a, the adapter 80 is slightly wider than the fork 78 of the bike and wraps around the fork 78 from the back and diagonally forward. A pair of bore openings 82 are formed at the outer ends of the adapter 80 to receive the free end 18a and 18b of the arcuate rod 16, respectively. To couple the adapter 80 to the fork 78, a bolt 84 protrudes toward the front of the bike centered between the bores 82. The bolt 84 is substantially long enough to protrude through the quarter-inch hole in the fork 78 so that it extends outside the front side of the fork 78 whereby a nut is used to tighten the adapter 80 to the fork 78.

Furthermore, the bolt 84 is off center between the first surface 86 and the second surface 88. The off center bolt 84 between the first and second surfaces allows the user to displace the arcuate rod 16 vertically depending on the position and angle of the lowermost frame. For example, in FIG. 4a, the off center bolt 84 is closer to the first surface 86. If, on the other hand, the lowermost frame of the bike is positioned higher than the one shown in FIG. 4a, a user can raise the arcuate rod 16 by flipping the adapter 80 so that the second surface 88 is on the top rather than on the bottom as shown in FIG. 4a. That is, since the bolt 84 is off center, by flipping the adapter 80 such that the second surface 88 is on the top, the arcuate rod 16 is displaced vertically upward.

With regard to the cartridge 20, universal joint 24 and the connector 28, they are substantially similar to the embodiment discussed above in FIGS. 1 through 3. Of course, in addition to the adapter 80, the universal joint and the connector may also be positioned about the lowermost frame of the cycle to couple the dampening apparatus assembly 10' to most, if not all, road bikes.

Figure 4B:
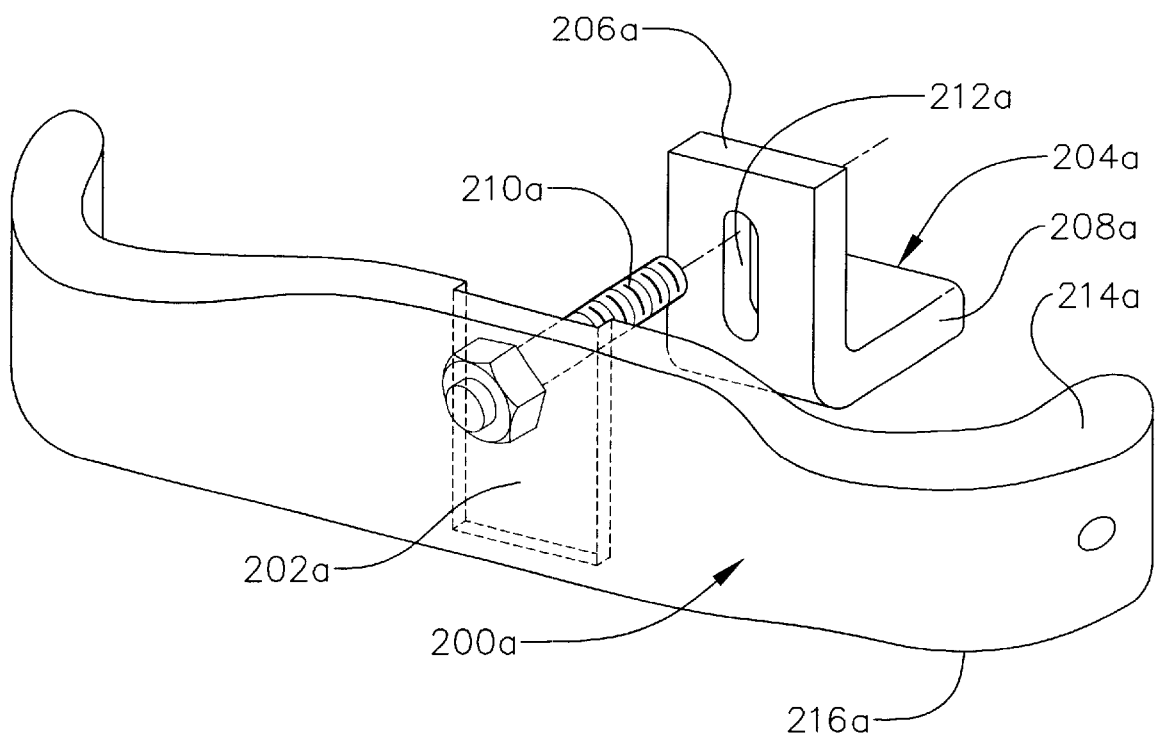
FIG. 4b is a perspective view of an exemplary adapter with a base member to firmly hold the adapter in place.
Figure 6:
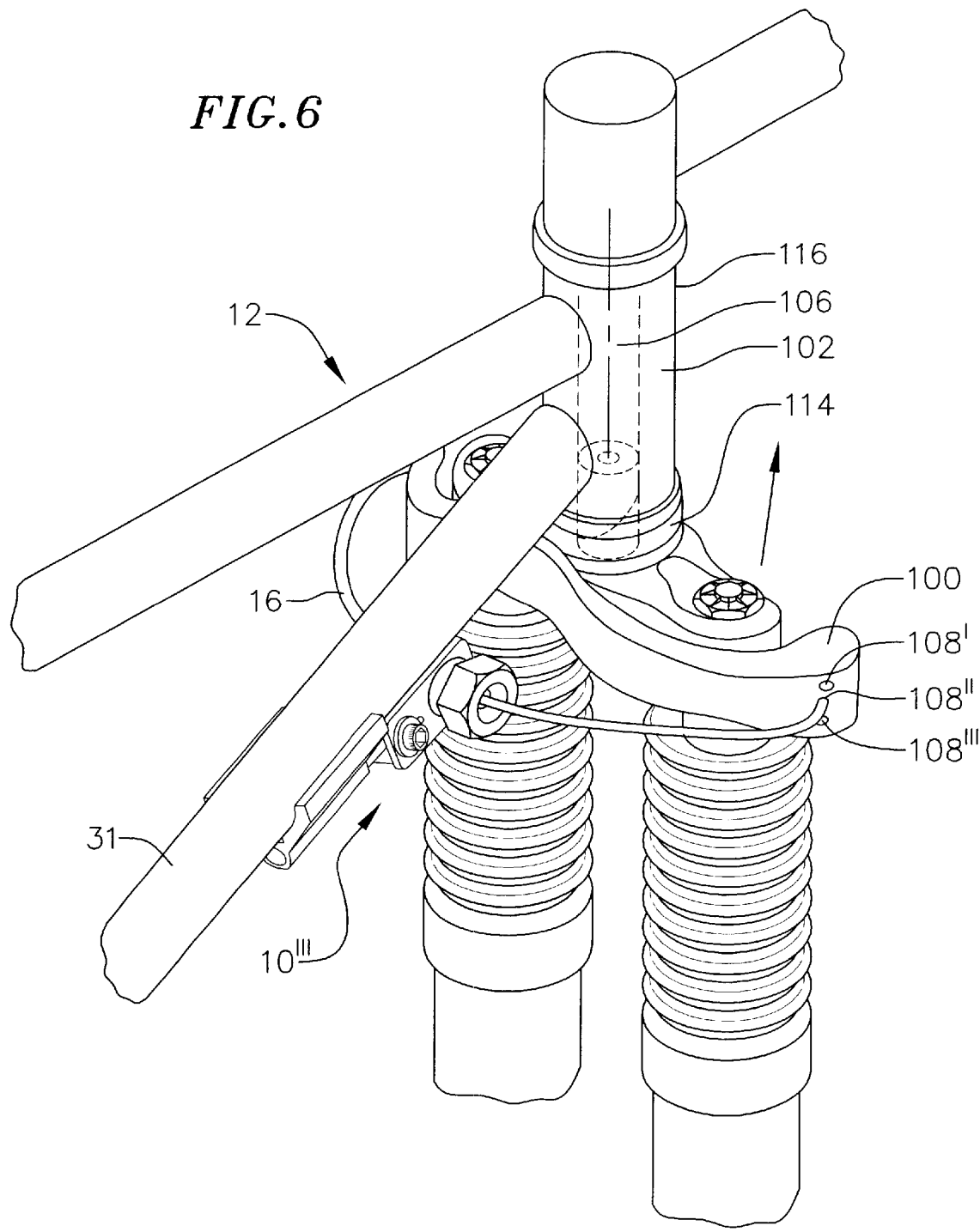
FIG. 6 is a perspective view of yet another exemplary dampening apparatus coupled to a mountain bike in accordance with an expander.

FIG. 4b illustrates by way of example an adapter 200 having a recess 202 prepared to receive a base member 204 (hereinafter base). Note that the adapter 200 is substantially similar to the adapter 80, except that the adapter 200 has the recess 202. The base 204 is substantially an L-shaped member having a face side 206 and a foot side 208. The face side 206 is fitted to flush against the recess 202 so that the face side 206 is prevented from rotating relative to the adapter, along the longitudinal axis of a bolt 210. Moreover, the face side 206 has an elongated opening 212 for the bolt 210 to penetrate therethrough. The elongated opening 212 allows the base 204 to be adjusted vertically relative to the adapter 200, so that when installing the adapter 200 to the bike 76 (see FIG. 4a), the foot side 208 may be flushed against the bottom side of the fork 78. Having the base 204 being flushed against the recess 202 and the bottom side of the fork prevents the adapter 200 from pivoting about the bolt 210. In other words, with the base 200, the adapter 200 is firmly coupled to the bike so that the adapter 200 does not pivot about the bolt 210 due to some torque load to the adapter.

Furthermore, the recess 202 may run between a first surface 214 and a second surface 216 of the adapter 200, so that the adapter 200 may be flipped as in adapter 80, and still allow the face side 206 of the base 204 to be flushed against the recess 202. In other words, without the unrecessed portion of the adapter adjacent to the second side 216, the face side may be vertically adjusted anywhere along the elongated opening, whether the adapter 200 is flipped so that the first surface 214 or the second surface 216 is on the top side.

FIG. 5 illustrates by way of example yet another dampening apparatus assembly 10". In this embodiment, a second adapter 90 is used to couple the dampening apparatus to an imitation mountain bike. By way of background, some bikes that look like mountain bikes are not mountain bikes at all. That is, imitation mountain bikes appear to have front shock absorbers but they are fake and have standard forks. The fork (lower steering mechanism) 91 on the imitation mountain bikes, however, are slightly wider than the fork on the riding bike as shown in FIG. 4a. For example, a standard fork on a riding bike is approximately 3½ inches wide between the centerlines of the fork, while the distance between the two legs on the mountain bike and the imitation mountain bikes are approximately 4½ inches wide between the centerlines. Accordingly, with the triple clamp 14, the adapters 80 and 90, most, if not all, bikes manufactured today may be fitted with the dampening apparatus assembly 10. Note in this embodiment, the lower steering mechanism is the fork 91.

As such, the adapter 90 for the imitation mountain bike is slightly wider than the dampening apparatus assembly 10' for the riding bike. Also, due to the wider width of the adapter 90, the free ends 18a and 18b of the arcuate rod 16 are inserted into the adapter 90 perpendicular to the back face of the adapter 90. Furthermore, as in FIG. 4a, the bolt 84' is off center so that the arcuate rod 16 may be vertically adjusted depending on the position and angle of the lowermost frame of the cycle. With regard to the cartridge 20, the universal joint 24, and the connector 28, they are substantially similar to the embodiment disclosed in FIGS. 1 through 3.

With regard to material, the triple clamp, the adapter, the cartridge, the universal joint, and the connector should be made of materials with high tensile and yield strength, such as aluminum or stainless steel. Preferably, a dampening apparatus assembly is made of 70–75 aluminum and the arcuate rod is made of stainless steel for corrosion resistance and strength. However, any other material with above qualities known to one of ordinarily skilled in the art is within the scope of the present invention.

Also, the terms "bike", "bikes", "cycle", "cycles", "bicycle" and "bicycles" are not used in the limiting sense in the description of the embodiments. In other words, above terms are not limited to mountain bikes, road bikes, or trick bikes, and may also include vehicles which have a front wheel coupled to a steering mechanism, such as motorized bikes and motorcycles. The term "lowermost" frame generally means the diagonal frame that couples the front wheel to the pedal. For most cycles with a triangular shaped frame as the one shown in FIG. 1, the lowermost frame is the frame 31. But for cycles with a single lower diagonal frame, without the top frame, the single lower diagonal frame would be the lowermost frame. Additionally, the term "lower steering mechanism" generally means an apparatus or assembly that couples the front wheel to the handle bar of a cycle.

As illustrated by way of example in FIGS. 6–10, an another embodiment of the present invention is shown coupling the dampening apparatus assembly 10''' to the exemplary mountain bike 12. In this embodiment, an adapter is used to couple or lock the dampening apparatus assembly to the mountain bike through a steering tube or shaft 102 of the bike. By way of background, mountain bikes have a steering tube 102 to link the triple clamp to the handle bar. Furthermore, most if not all of the steering tubes have an inner opening 106 to reduce the weight of the steering tube. Accordingly, with this embodiment, an expander 104 is used to mount the dampening apparatus assembly 10''' by inserting the expander 104 into the inner opening 106 to lock the expander 104 within the steering tube. Of course, the expander 104 may be unlocked from the inner opening 106 so that the dampening apparatus assembly 10''' may be disengaged from the bike.

Figure 7:
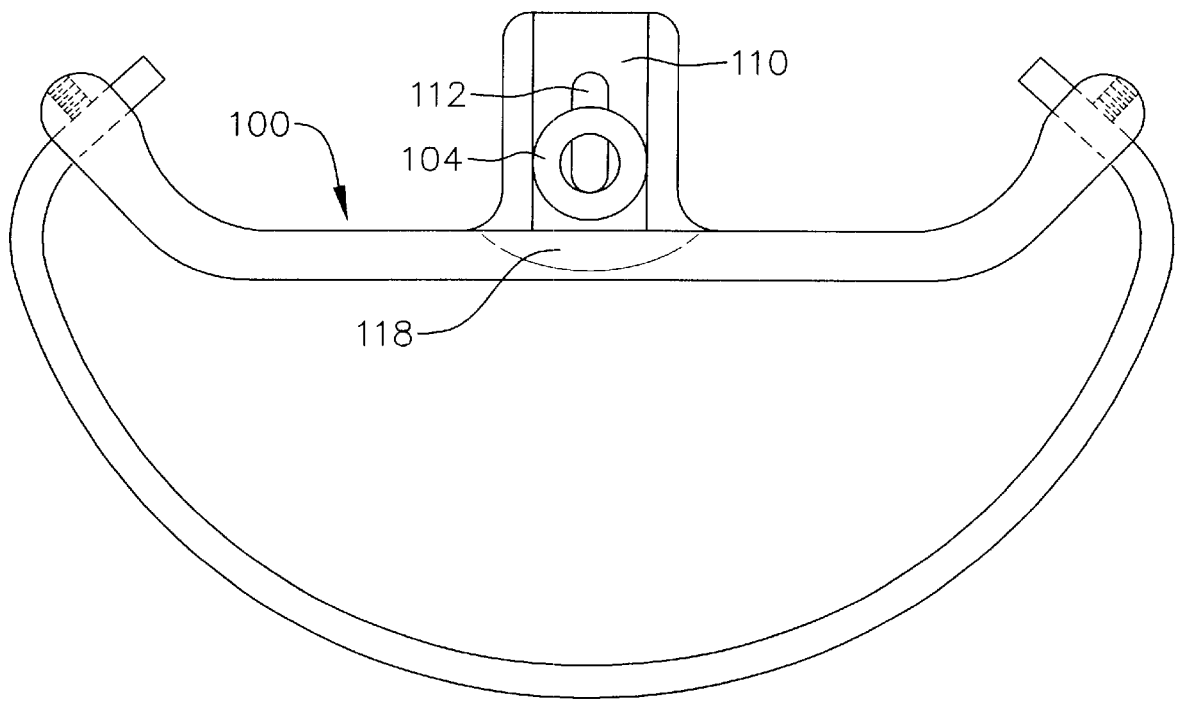
FIG. 7 is a top view of an adapter supporting an exemplary expander.

To adjust the vertical placement of the arcuate rod 16 depending on the particular placement of the lowermost frame 31 of the cycle, the adapter 100 has a number of pair bore openings 108', 108", and 108''' along the sides of the adapter so that the arcuate rod 16 may be secured to the adapter along any number of the pair of bore openings. Furthermore, as illustrated in FIG. 7, the adapter 100 has a base 110 to support the expander 104. The base 110 has a slotted opening 112 to allow the positioning of the expander 104 to be adjustable along the slotted opening so that the expander 104 can fit into a variety of bottom cups having different dimensions. Moreover, the adapter 100 has a semi-circular recess 118 so that the bottom cup can rest within the recess.

Figure 8:
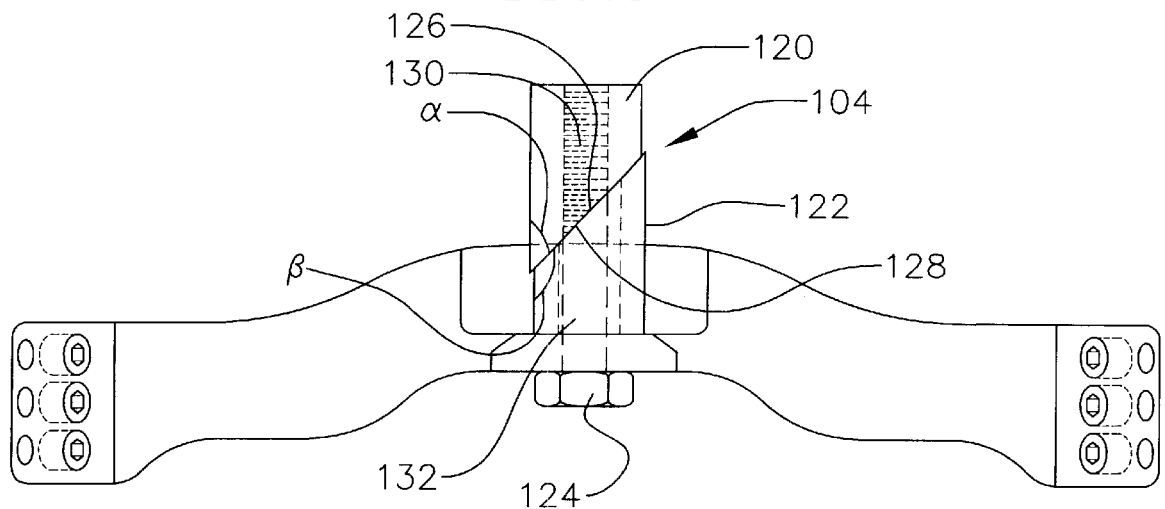
FIG. 8 is a front view of the adapter according to FIG. 7 and an exemplary expander.
Figure 9:
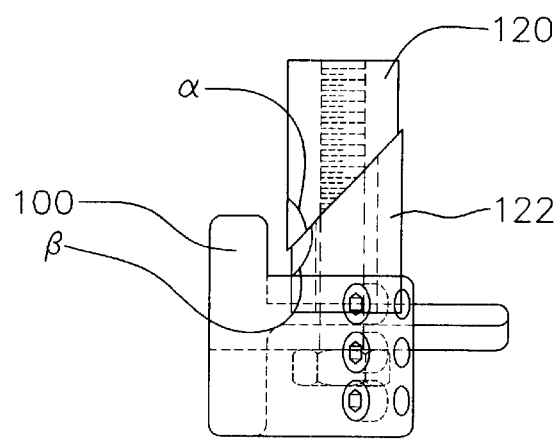
FIG. 9 is a side view of the adapter according to FIG. 7 and an exemplary expander.

As illustrated by way of example in FIGS. 8 and 9, the expander 104 includes a first member 120 juxtaposed with a second member 122 and a connector 124 coupling the two. The first member 120 has an acute face side 126, where the angle α is an acute angle, i.e., less than 90°. Conversely the second member has an obtuse face side 128, where the angle β is an obtuse angle, i.e., greater than 90°. Note that the combination of angles α and β is substantially 180°. The acute face of the first member 120 may be adapted to receive the connector 124, via a threaded opening 130 adapted to rotatably couple to the connector 124. The second member has an opening 132 along the longitudinal axis of the second member, so that at least a portion of the connector 124 can run through the opening 132 and couple to the threaded opening 130 of the first member 120. Note that the circumference of the opening 132 is greater than the diameter of the threaded opening 130 so that the first and second members may slide relative to one of another as the connector is tightened. An exemplary connector may be a thread bolt or any other apparatus that can apply axial force between the first and second members so that the first and second members will slide relative to each other.

Once the connector is activated, such as, a bolt that is turned, the acute and obtuse face members align as illustrated in FIG. 8; and since the faces are angled and juxtaposed relative to each other, the two faces will slide when compressed by the bolt. The relative sliding motion of the two faces causes the two faces to move laterally with respect to each other such that the outer walls of the two members will come in contact with the inner side of the steering tube 102. In other words, there will be at least some portions of the first and second members that will engage with the interior side of the steering tube to lock the expander in place. Accordingly, any rotation in the steering tube 102 will also cause the expander 104 to rotate as well, which naturally causes the arcuate rod 16 to rotate through the adjustable dampening cartridge 20 to dampen any vibration in the handle bar.

Later, the connector can be deactivated, i.e., the bolt may be unscrewed, to unlock the expander within the interior of the steering tube so that the expander can be removed. Also, as illustrated in FIG. 9, the acute α and obtuse β angles of the top and base members may be position anywhere within the steering tube, for example, in this instance the angles are facing towards the back side of the adapter 100.

Figure 10:
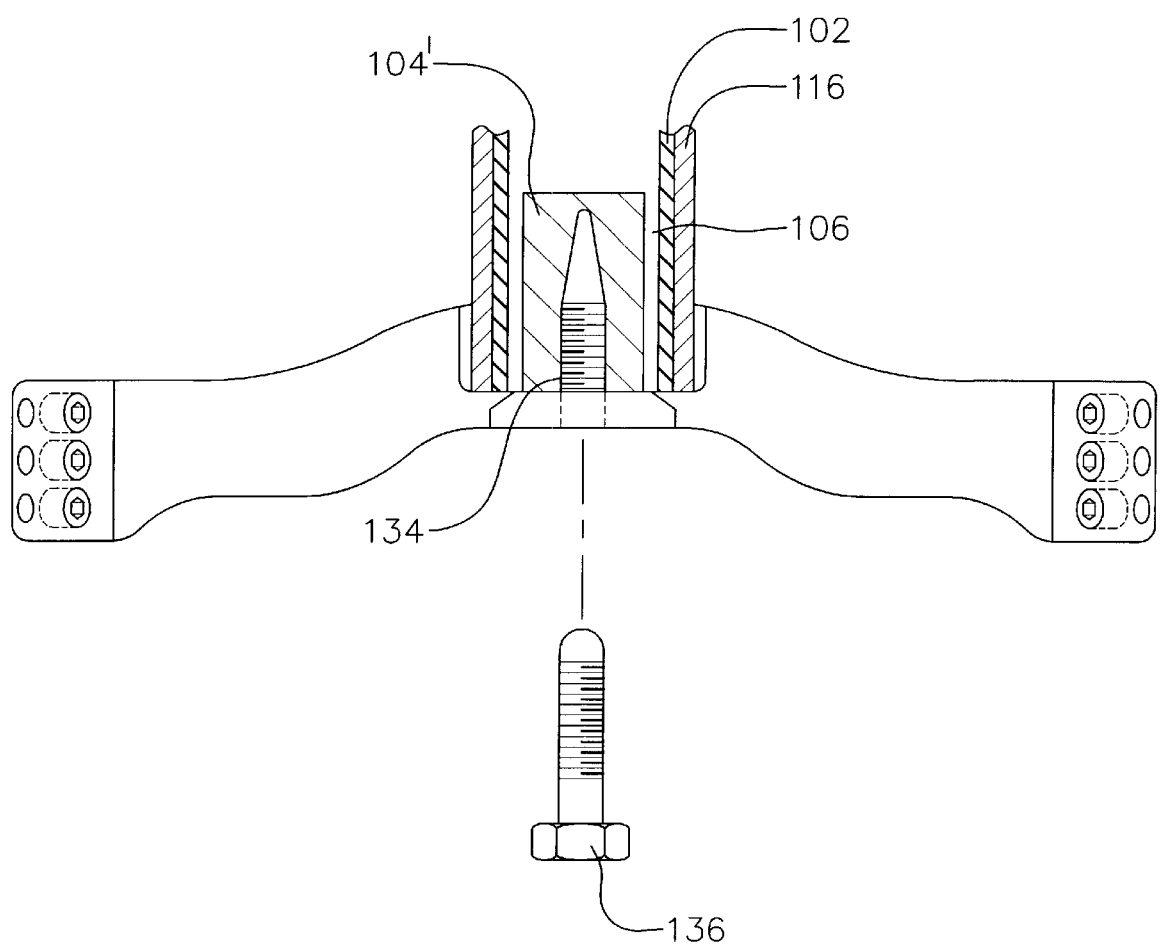
FIG. 10 is a front view of yet another embodiment of an expander.
Figure 11:
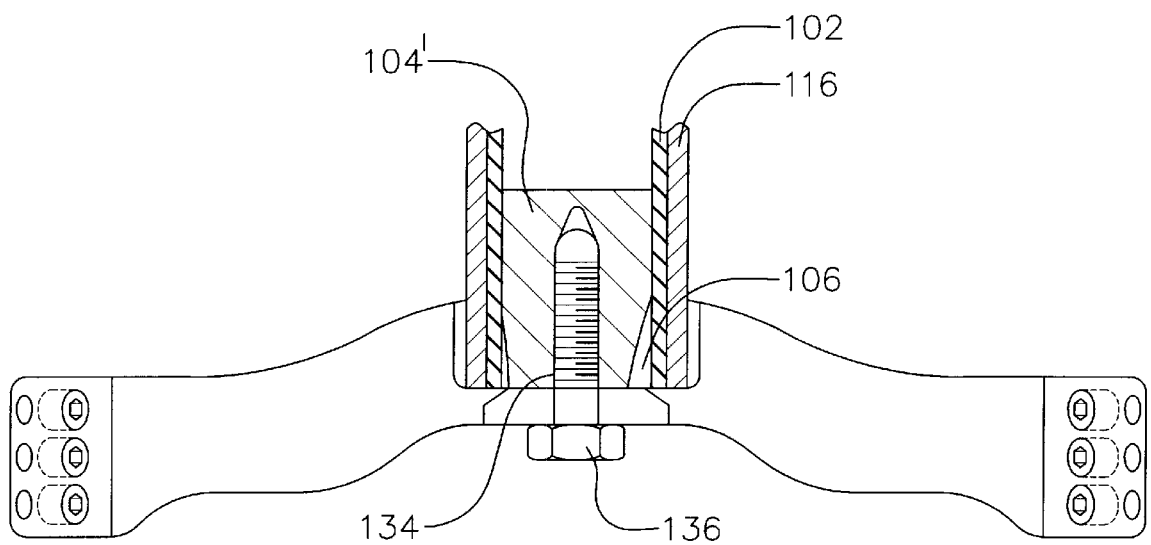
FIG. 11 is a front view of the expander in accordance with FIG. 10 with the expander in an expanded position.

FIGS. 10 and 11, illustrate by way of example an another embodiment of the expander 104'. In this embodiment, the expander 104' is a unitary piece adapted to receive a connector 136, such as a bolt. For example, the expander 104' may have a recess 134 adapted to receive the connector 136. As illustrated in FIG. 10, when the bolt 136 is in a disengagement position, the expander 104' has a smaller circumference than the inner diameter of the steering tube 102. In other words, the expander is in an unlocked position so that the expander can be inserted into the inner opening 106 of the steering tube 102. Alternatively, the circumference of the expander may be substantially similar to the inner diameter of the steering tube, so that the expander may be press fitted into the opening 106. However, as illustrated in FIG. 11, when the connector 136 is inserted into the recess 134 the circumference of the expander 104' expands to be in a locked position. In other words, a substantial portion of the expander are now in contact with the steering tube 102 to lock the expander within the interior of the steering tube. Accordingly, as with the above expander embodiment, any rotation in the steering tube 102 will also cause the expander 104' to rotate as well, which naturally causes the arcuate rod 16 to rotate through the adjustable dampening cartridge 20 to dampen any vibration in the handle bar. Note that for both expanders, once the bolt is disengaged the expander may be removed from the inner opening 106 to remove the whole assembly.

Figure 12A:
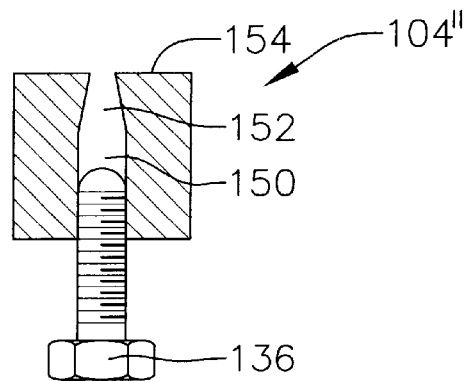
FIG. 12a is a cross-sectional view of an another exemplary expander with a bolt partially inserted into the threaded opening of the exemplary expander.
Figure 12B:
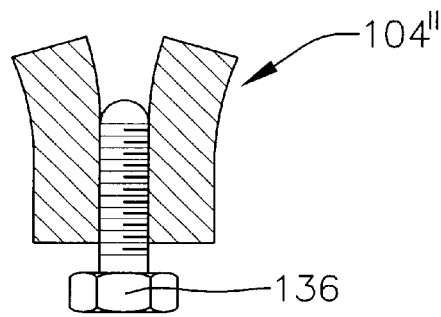
FIG. 12b is a cross-sectional view of the exemplary expander in accordance with the FIG. 12a with the bolt inserted into the threaded opening of the exemplary expander.

FIGS. 12a and 12b, illustrate by way of example yet another embodiment of a unitary expander 104". In this embodiment, the expander 104" has a threaded opening 150 with a cone shape portion 152 that converges towards the top 154 of the expander 104". Accordingly, as illustrated in FIG. 12b, as the connector 136, such as a bolt, engages with the cone shape portion 152, the top 154 of the expander 104" expands to lock the expander 104" to the interior of the steering tube. In other words, once the connector 136 is inserted through the cone shape portion, the top portion of the expander expands to lock the expander within the steering tube of the cycle.

Figure 13A:
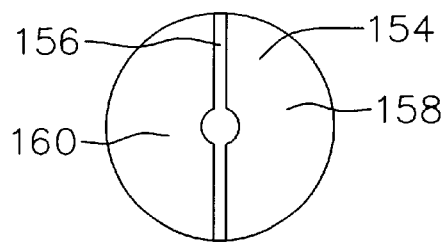
Figure 13B:
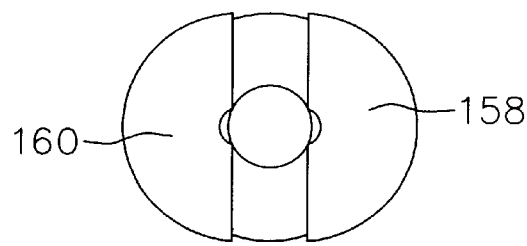
FIG. 13b is an exemplary top view of the exemplary expander in accordance with FIG. 12b.
Figure 14A:
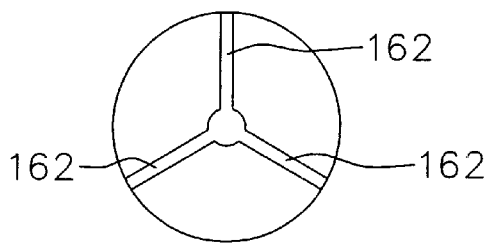
Figure 14B:
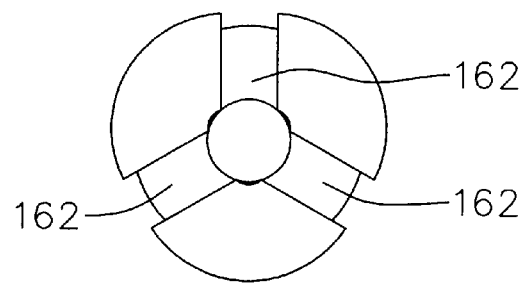
FIG. 14b is an another exemplary top view of the exemplary expander in accordance with FIG. 12b.
Figure 15A:
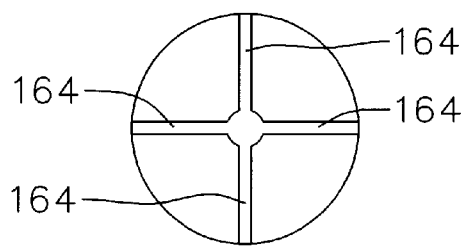
Figure 15B:
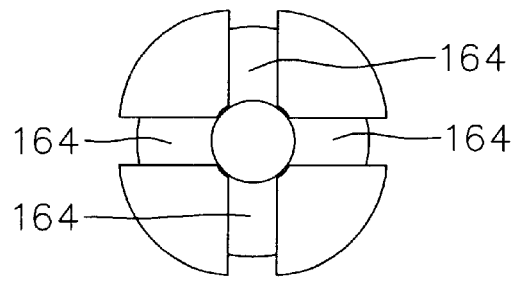
FIG. 15b is yet an another exemplary top view of the exemplary expander in accordance with FIG. 12b.

With regard to the topside of the expander, FIGS.13a–13b, illustrates topside 154 of the expander 104" with a single slot 156. Here, the top portion of the expander has the slot 156 dividing the top portion of the expander into two sides 158 and 160. As illustrated in FIG. 16a, the slot 156 cuts through approximately upper half portion of the expander 104", and as illustrated in FIG. 16b, the two sides 158 and 160 split when the connector (bolt) is inserted through the cone shape portion 152 of the expander. Alternatively, as illustrated in FIGS. 14a–14b and 15a–15b, the top portion of the expander may be have three slots 162 or four slots 164, respectively; such that when the bolt is inserted through the cone shape portion, the slots 162 and 164 expand accordingly to place the expander in a locked position. Note that once the bolt is disengaged with the cone shape portion 152 of the expander, the top portion of the expander is returned to its unlocked position. In other words, the expander substantially retracts to its original position, so that the expander 104" may be removed from the steering tube.

With regard to material, the expander may be made of aluminum, stainless steel, rubber, or any materials known to one of ordinarily skilled in the art that will provide sufficient expansion and friction with the steering tube 102 to rotate the arcuate rod 16.

There are several advantages to the above embodiment. For example, with the expander, the dampening apparatus assembly, 10''' can be installed to, most if not all, mountain bikes no matter the width of the shocks, the diameter of the shocks, or the angle of the shocks. Another advantage is that the dampening apparatus assembly may easily be installed while saving the cost of producing a separate triple clamp. The expander may be made of one piece or multiple pieces. Also, other apparatus or methods known to one of ordinarily skilled in the art of coupling dampening apparatus assembly by installing a locking apparatus within the inner opening 106 of the steering tube 102 is within the scope of the present invention. For example, a compressible rubber may be placed between a pair of compression plates, where the compression plates are coupled so that the compression plates may be compressed to expand the compressible rubber in between, to lock the rubber with the interior of the steering tube.

Moreover, the expander may be used with any bicycles that have an inner opening within the steering tube to mount the dampening apparatus assembly. Alternatively, any other apparatus may be conveniently locked within the interior of the steering tube of the cycle. Furthermore, the inner opening 106 need not be circular, i.e., it can also have a square cross-section which is adapted to receive an expander with a square cross-section. The connector may also be. any apparatus or means such that it applies compressive force between the first and second members so that the two juxtaposed members may slide relative to each other. With regard to the unitary expander, the connector may be any apparatus or means such that when it engages with the expander, at least a portion of the expander expands to lock with the interior wall of the steering tube; and when it is disengaged with the expander, the expander is returned to its unlocked position.

FIGS. 17A through 21B illustrates by way of an example yet another embodiment of the present invention including a frame holder 200 adapted to receive a cartridge holder 250, and likewise, wherein the cartridge holder 250 is adapted to receive an adjustable dampening cartridge 300. One of the objectives of this embodiment is to provide a dampening assembly with minimal parts so that it is lightweight but strong as possible.

Figure 17A:
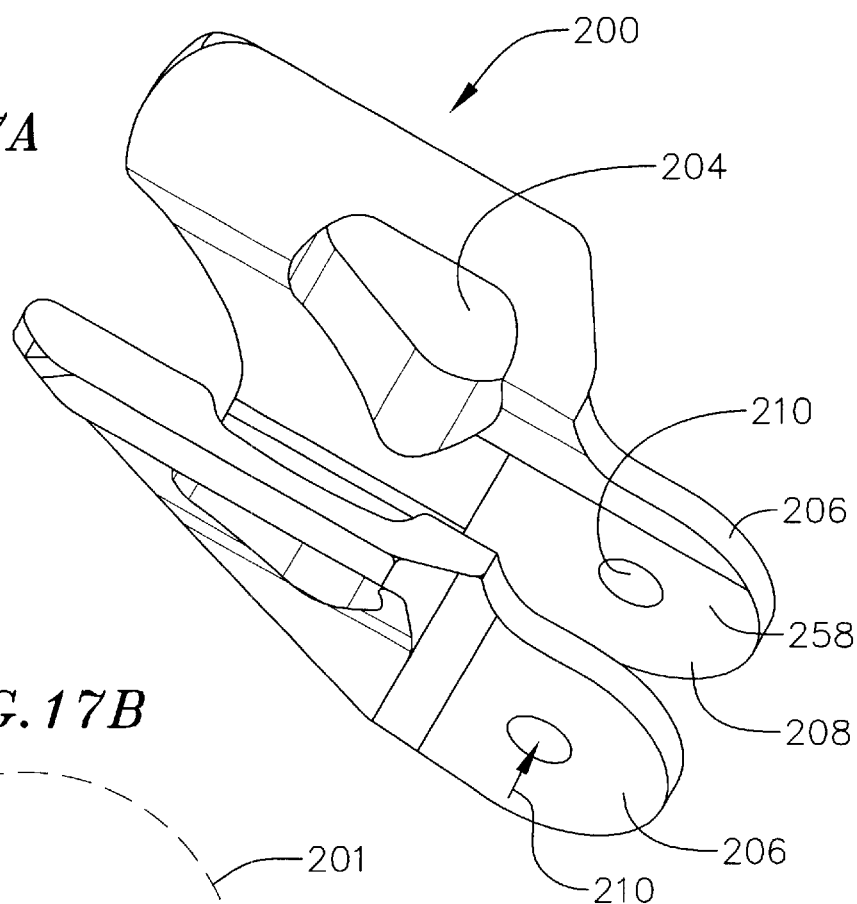
FIG. 17A is an exemplary perspective view of another embodiment of a frame holder.
Figure 17B:
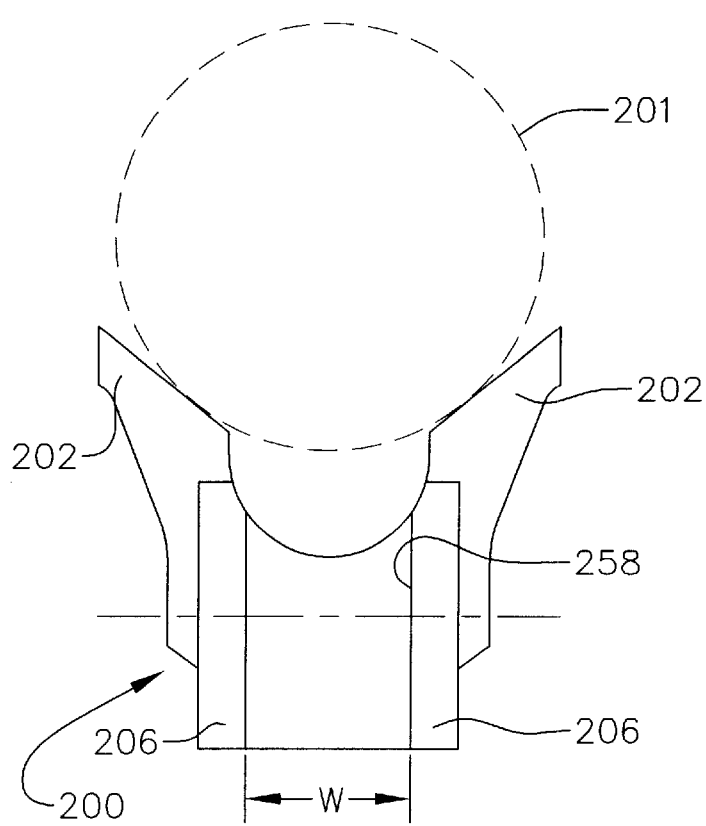
FIG. 17B is an exemplary front view of the frame holder in FIG. 17A.
Figure 17C:
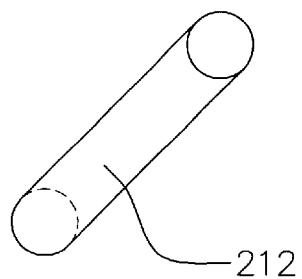
FIG. 17C is an exemplary perspective view of a dowel pin.

In particular, as illustrates by way of example in FIGS. 17A and 17B the frame holder 200 has "V" shape flanges 202 forming a cavity adapted to couple to a lowermost frame 201 of a bicycle. Moreover, a triangular shape opening 204 may be formed on each side of the flange 202 to minimize the weight of the frame holder 200. For example, one skilled in the art may use Finite Element Analysis to design the frame holder to minimize the weight of the frame holder 200 but still maintain its strength. Of course, the opening 204 is optional and is not necessary for the operation of the present invention.

Still further, the frame holder 200 has substantially parallel arms 206 forming a recess 208 in between the two parallel arms 206. Moreover, each of the arms 206 has a hole 210 that are axially aligned so that a dowel pin 212 may be inserted through the holes 210.

Figure 18A:
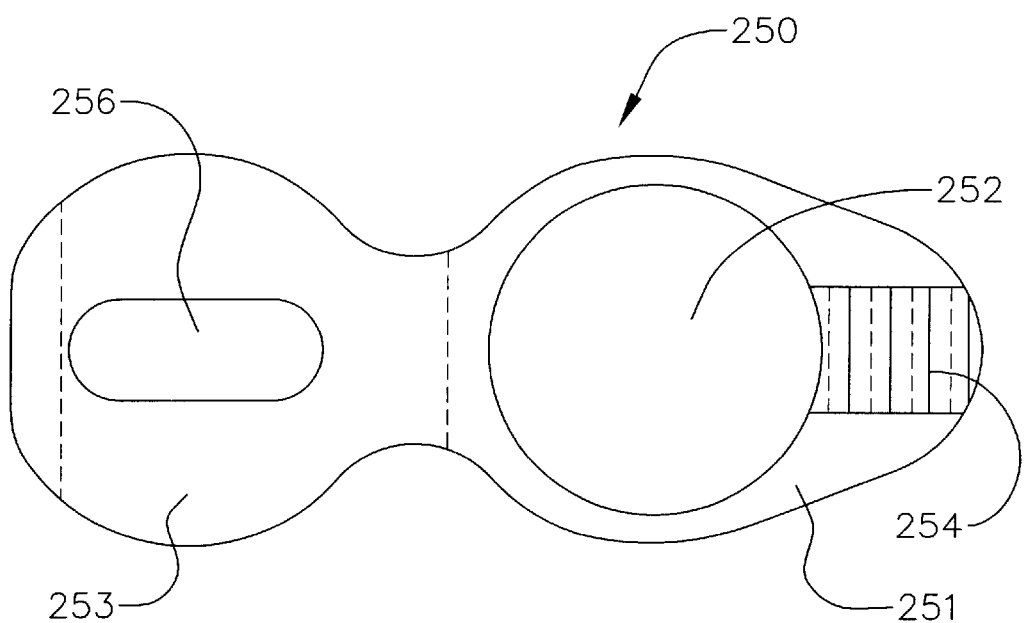
FIG. 18A is an exemplary front view of a cartridge holder.
Figure 18B:
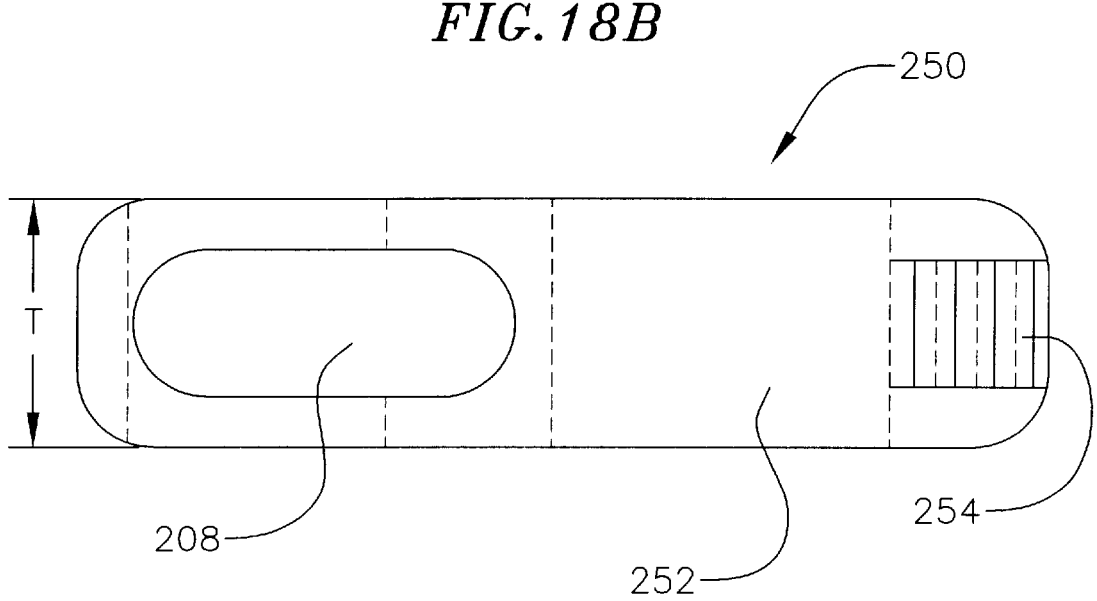
FIG. 18B is an exemplary side view of the cartridge holder in FIG. 18A.

FIGS.18A and 18B illustrates by way of example the cartridge holder 250 generally defining two areas: a ring area 251 and a circular plate area 253, both areas forming an hourglass shape. As shown in FIG. 18A, the ring area 251 has an opening 252 adapted to receive the adjustable dampening cartridge 300. Moreover, adjacent to the opening 252 is a treaded opening 254 adapted to receive a bolt (not shown) so that it may be tighten against the cartridge 300 to hold it in place. The circular plate area 253 has a slotted opening 256 adapted to receive the dowel pin 212, however, the dowel pin 212 may slide along the slotted opening 256. Still further, the cartridge holder 250 may have additional slotted openings such as opening 208 as shown in FIG. 18B to reduce the weight of the cartridge holder 250.

Figure 19A:
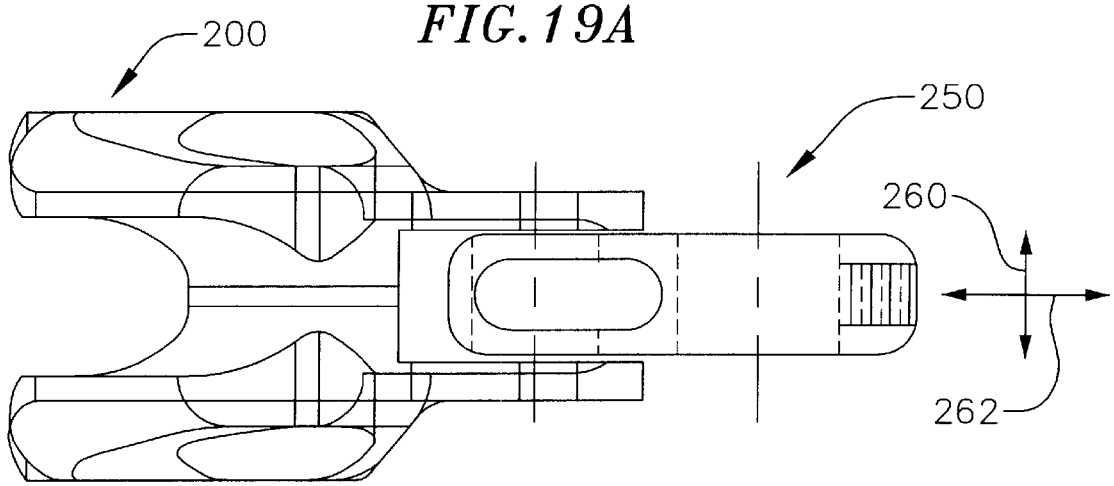
FIG. 19A is an exemplary assembly view of the frame holder according to FIG. 17A and the cartridge holder according to FIG. 18A.
Figure 19B:
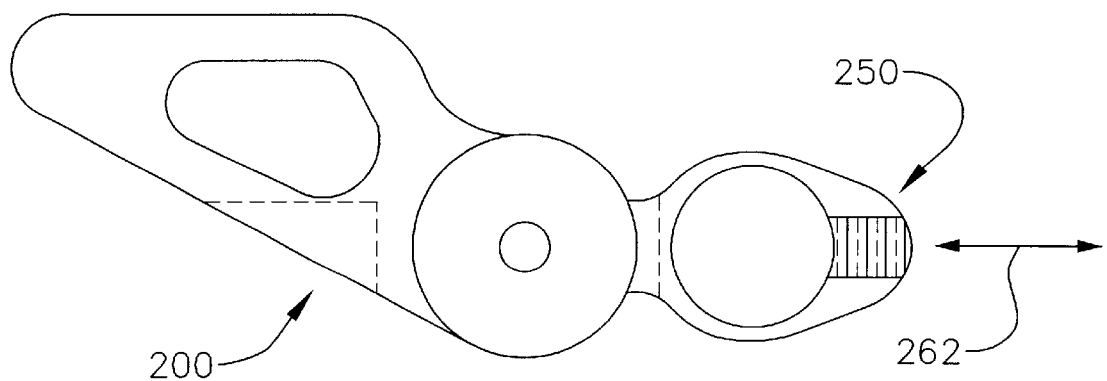
FIG. 19B is an exemplary assembly side view of FIG. 19A.

Once the cartridge holder 250 in inserted into the recess 208 and the dowel pin 212 is inserted through the holes 210 and the slotted opening 256, the cartridge holder 250 may pivot and slide axially as defined by direction arrow 262 in FIGS. 19A and 19B. In particular, the thickness "T" of the cartridge holder 250 may be substantially similar or slightly less than the width "W" of the recess 208 of the frame holder 200. This way as shown by way of example in FIGS. 19A and 19B, the cartridge holder 250 may snuggly fit within the recess 208. Moreover, the circular plate area 253 has a large surface area so that a large contact surface area is created between the inner surface areas 258 of the two arms 206 and the circular plate area 253. This way, there is very little, if any, lateral play between the cartridge holder 250 and the frame holder 200. For example, the clearance between the cartridge holder 250 and the arms 206 may be about $\frac{1}{1000}$ of an inch. The clearance can also be within a range of, for example, $\frac{1}{100}$ to $\frac{1}{1000}$ inches.

One of the advantages with this embodiment is that the large surface area contact and the snug fit minimize the lateral movement of the cartridge holder so that it does not interfere with the dampening cartridge 300 from dampening the rod as it moves within. That is, any lateral movement on the part of the cartridge holder 250 would prevent the dampening cartridge 300 from effectively working because it would simply vibrate with the rod running therethrough.

Again, the slotted opening 256 allows the cartridge pin 256 to slide in the axial direction 262 as well as pivot about the dowel pin 212. This allows the cartridge holder 250 to accommodate and compliment the movements of the fork of the bicycle. Another advantage with this embodiment is that there is no need for a rod 70 as shown in FIG. 3 in the above embodiment. With regard to the dowel pin 212, it may have a diameter within a range, for example, of 3/16 inch to 3/8 inch, or more specifically, can have a diameter of about 1/4 inch.

FIGS. 20A through 21B illustrates by way of example a dampening cartridge 300 having a nozzle opening 302 and a threaded opening 304. The threaded opening 304 is adapted to receive an adjustable nut 350 having an outer threaded end 352 and a cone like opening end 354. Like the embodiment illustrated in FIG. 3, the adjustable nut 350 has an inner face 360 and the dampening cartridge 300 has a concave face 362 so that inner face 360 and the concave face 362 are concave facing one another when the nut 350 is rotated relative to the cartridge 300. The space between the two faces 360 and 362 are similar to the space between the cap 52 and the adjustable nut 56 in FIG. 3, so that a dampening material 64 which may be initially formed from a flat rectangular shape may be fitted into the space. However, unlike FIG. 3, the length of the combined nut 350 inserted into the cartridge 300 is smaller than the overall length of the cartridge 20 and the adjustable nut 56.

Figure 20A:
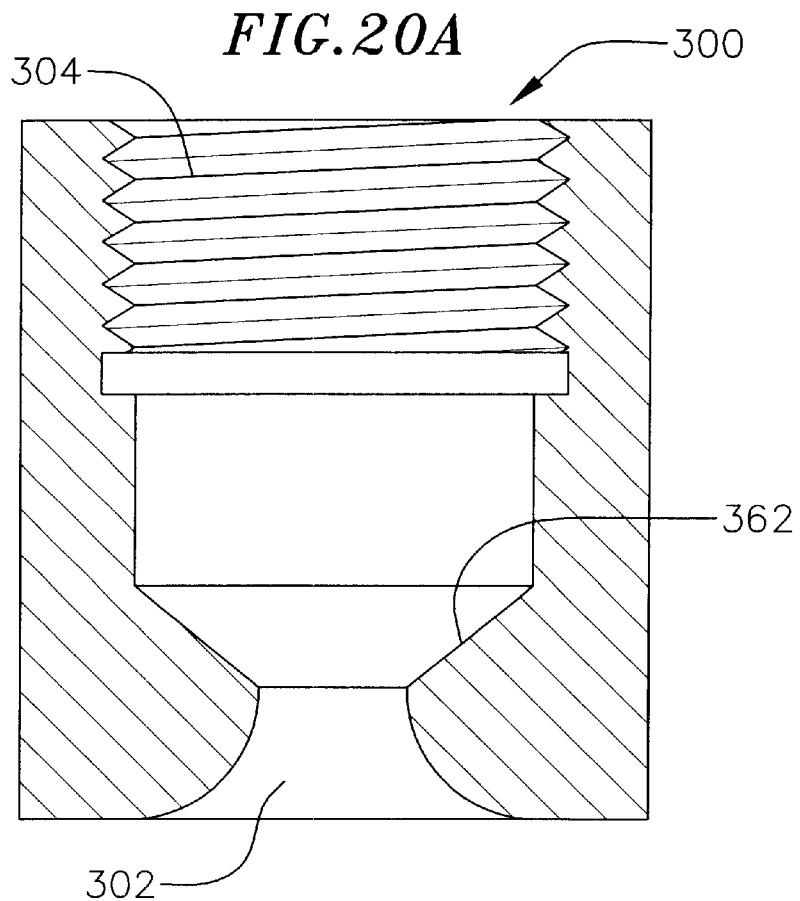
FIG. 20A is an exemplary cross-sectional view of an adjustable dampening cartridge.
Figure 20B:
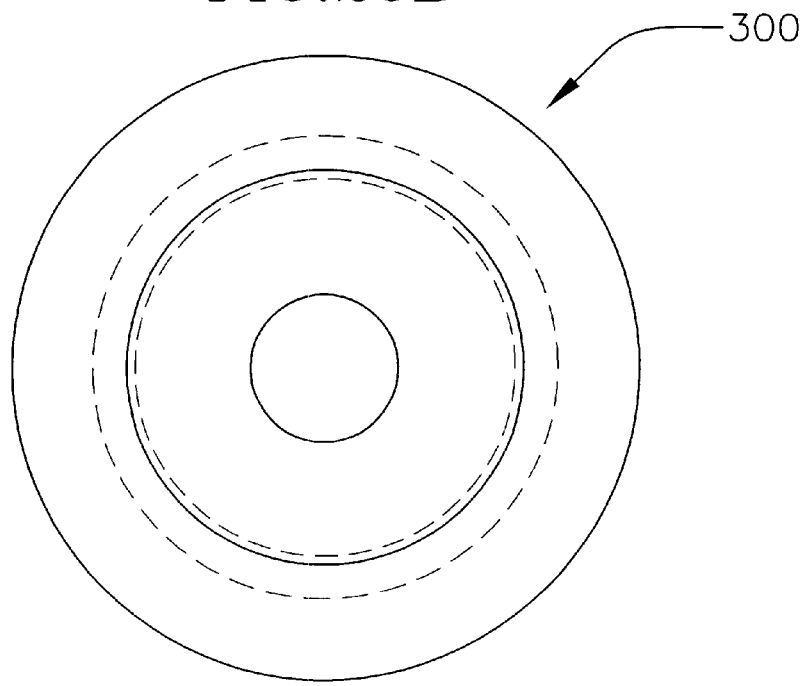
FIG. 20B is an exemplary side view of the adjustable dampening cartridge in FIG. 20A.
Figure 21A:
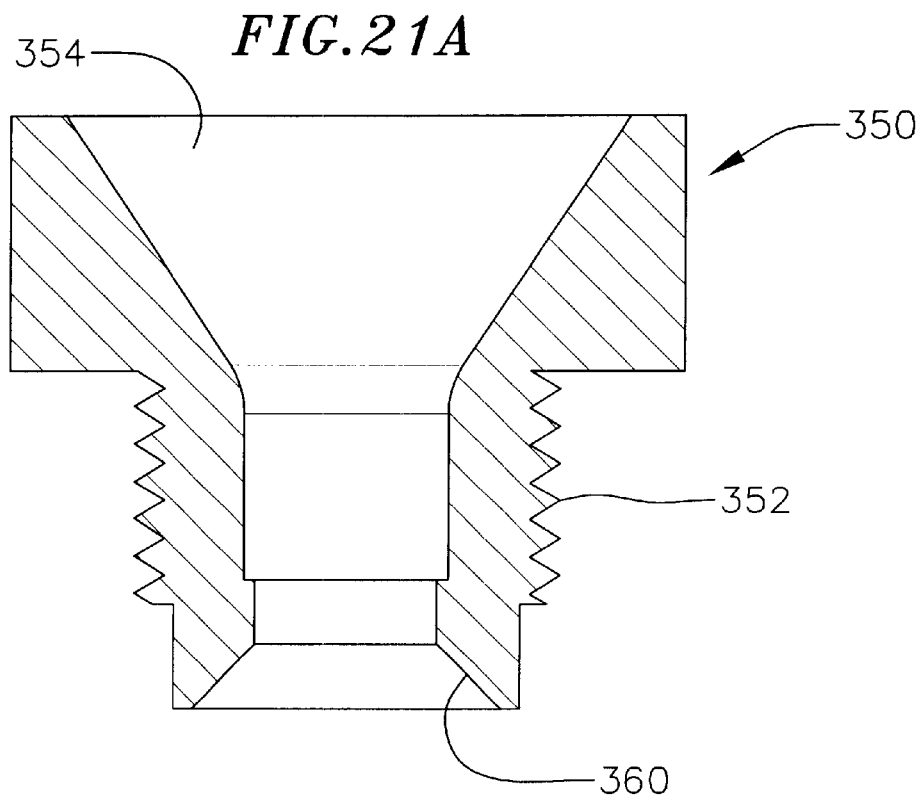
FIG. 21A is an exemplary cross-sectional view of an adjustable nut.
Figure 21B:
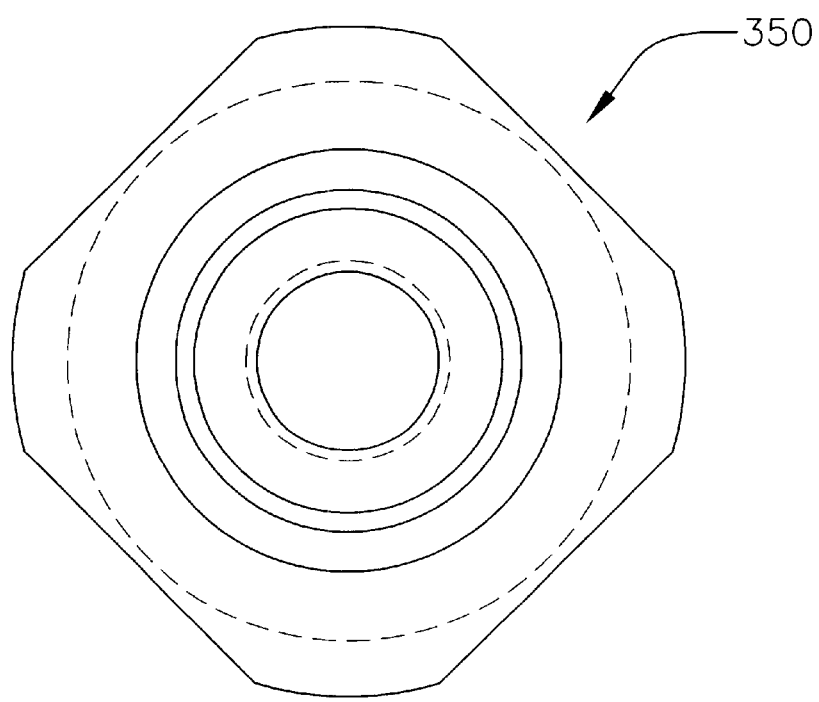
FIG. 21B is an exemplary side view of the adjustable nut in FIG. 21A.

As shown in FIG. 20A, with a shorter length, the dampening cartridge 300 may be straight rather than being curved and still not interfere with the rod running through the cartridge 300 and the nut 350. A shorter and straighter cartridge 300 is simpler to manufacture and minimizes its weight. Moreover, the openings 302 and 354 are wider so that they do not interfere with the rod as well. To further minimize the weight of the cartridge, it may be made of a variety of lightweight materials yet strong, such as Black Delrin, Kevlar, Nylon, Teflon, titanium, and aluminum.

In closing, it is noted that specific illustrative embodiments of the invention have been disclosed hereinabove. However, it is to be understood that the invention is not limited to these specific embodiments. Accordingly, the invention is not limited to the precise embodiments described in detail hereinabove. With respect to the claims, it is applicant's intention that the claims not be interpreted in accordance with the sixth paragraph of 35 U.S.C. § 112 unless the term "means" is used followed by a functional statement.

While the specification describes particular embodiments of the present invention, those of ordinary skill can devise variations of the present invention without departing from the inventive concept.

I claim:

1. An apparatus assembly for dampening the steering of a cycle, the cycle having a lower steering mechanism connecting the handlebar of the cycle to the front wheel and having a frame, the frame being coupled with the lower steering mechanism, the apparatus assembly comprising:

a cartridge having a passage and having a dampening material located within the passage, the dampening material having an axial length and having an opening along its axial length, the cartridge being configured to be coupled to the frame of the cycle and to impart a plurality of different compressive forces to the dampening material independent of lower steering mechanism position; and a rod being substantially arc-shaped and being adapted to couple to the lower steering mechanism of the cycle, the rod passing through the opening of the dampening material of the cartridge;

wherein the dampening material provides a variable frictional resistance to the rod as the rod runs through the opening of the dampening material that is a function of the compressive force imparted by the cartridge.

2. The apparatus of claim 1, wherein the lower steering mechanism includes a clamp, the clamp having first and second opposing ends, the rod having first and second free ends, wherein the first and second opposing ends of the clamp are coupled to the first and second free ends of the rod, respectively.

3. The apparatus of claim 2, wherein the arc of the rod has a predetermined radius and twice the predetermined radius is greater than the distance between the first and second opposing ends of the clamp.

4. The apparatus of claim 1, wherein the arc of the rod has a substantially semi-circular shape.

5. The apparatus of claim 1, wherein the lower steering mechanism may be turned in an arc of substantially 180 degrees.

6. The apparatus of claim 1, wherein the frame is a lowermost frame of the cycle.

7. The apparatus of claim 1, further including an adapter coupled to the lower steering mechanism, wherein the adapter has first and second sides and between the first and second sides is an off center thread adapted to associate with a bore on the lower steering mechanism with the first side on top or bottom side of the clamp to adjust the horizontal level of the rod respect to the lowermost frame of the cycle.

8. The apparatus of claim 1, further including:

a) an adapter having a recess adapted to receive a base and an port adapted to receive a bolt;

b) the lower steering mechanism having a bore adapted to receive the bolt and a bottom side; and c) the base between the adapter and the lower steering mechanism, the base having a face side and a foot side, wherein the face side has an elongated hole adapted to receive the bolt and fitted to be flushed against the recess of the adapter;

d) wherein the foot side of the base may be adjusted to flush against the bottom side of the lower steering mechanism;

e) wherein when the bolt couples the adapter, base, and lower steering mechanism, the base substantially prevents the adapter from pivoting about the bolt.

9. An apparatus assembly for dampening the steering of a cycle, the cycle having a lower steering mechanism connecting the handlebar of the cycle to the front wheel and having a frame, the frame being coupled with the lower steering mechanism, the apparatus assembly comprising:

a cartridge having a passage and having a dampening material located within the passage, the dampening material having an axial length and having an opening along its axial length, the cartridge being adapted to be coupled to the frame of the cycle;

a rod being substantially arc-shaped and being adapted to couple to the lower steering mechanism of the cycle, the rod passing through the opening of the dampening material of the cartridge, wherein the dampening material is capable of being compressed to provide variable resistance to the rod as the rod runs through the opening of the dampening material; and a universal joint coupled to the cartridge and having a pivot arm adapted to couple to the frame of the cycle.

10. The apparatus of claim 9, further including a connector coupled to the frame of the cycle and having a port therethrough, the pivot arm of the universal joint associating with the port of the connector.

11. An apparatus assembly for dampening the steering of a cycle, the cycle having a lower steering mechanism connecting the handlebar of the cycle to the front wheel and having a frame, the frame being coupled with the lower steering mechanism, the apparatus assembly comprising:

a cartridge having a passage and having a dampening material located within the passage, the dampening material having an axial length and having an opening along its axial length, the cartridge being adapted to be coupled to the frame of the cycle and having an outer shell with first and second openings, the first opening of the shell having a cap with a first hole, the second opening of the shell having an adjustable nut with a second hole, the first and second holes forming part of the passage, and the dampening material being located between the cap and adjustable nut; and a rod being substantially arc-shaped and being adapted to couple to the lower steering mechanism of the cycle, the rod passing through the opening of the dampening material of the cartridge;

wherein the dampening material is capable of being compressed to provide variable resistance to the rod as the rod runs through the opening of the dampening material and adjusting the adjustable nut to compress the dampening material increases friction between the dampening material and the rod.

12. The apparatus of claim 11, wherein:

a) the cap and adjustable nut have a concave inner face to associate with the dampening material.

13. The apparatus of claim 11, wherein the shell of the cartridge has an arc substantially similar to the arc of the rod.

14. The apparatus of claim 11, wherein the cap is adjustable to compress the dampening material.

15. An apparatus assembly for dampening the steering of a cycle, the cycle having a lower steering mechanism connecting the handlebar of the cycle to the front wheel and having a frame, the frame being coupled with the lower steering mechanism, the lower steering mechanism including a triple clamp having first and second opposing ends adapted to couple with the fork of a mountain bike, the apparatus assembly comprising:

a cartridge having a passage and having a dampening material located within the passage, the dampening material having an axial length and having an opening along its axial length, the cartridge being adapted to be coupled to the frame of the cycle; and a substantially arc-shaped rod having first and second free ends respectively adapted to be coupled to the first and second opposing ends of the triple clamp, the rod passing through the opening of the dampening material of the cartridge, wherein the dampening material is capable of being compressed to provide variable resistance to the rod as the rod runs through the opening of the dampening material.

16. The apparatus of claim 15, wherein the triple clamp has top and bottom sides, wherein the triple clamp has at least two recesses on each side of the first and second opposing sides between the top and bottom sides of the triple clamp adapted to receive the first and second free ends of the rod, respectively.

17. An apparatus assembly for dampening the steering of a cycle, the cycle having a lower steering mechanism connecting the handlebar of the cycle to the front wheel and having a frame, the frame being coupled with the lower steering mechanism, the apparatus assembly comprising:

a cartridge having a passage and having a urethane dampening material located within the passage, the urethane dampening material having an axial length and having an opening along its axial length, the cartridge being adapted to be coupled to the frame of the cycle; and a rod being substantially arc-shaped and being adapted to couple to the lower steering mechanism of the cycle, the rod passing through the opening of the urethane dampening material of the cartridge, wherein the urethane dampening material is capable of being compressed to provide variable resistance to the rod as the rod runs through the opening of the urethane dampening material.

18. A dampener for steering a bicycle, wherein the bicycle has a lower steering mechanism and a lowermost frame coupling the lower steering mechanism to a pedal of the bicycle, comprising a) an arcuate rod having two free ends coupled to the lower steering mechanism;

b) an adjustable dampener with a passage, the passage housing a dampening material, the dampening material providing resistance to the movement of the rod running through the passage of the dampener;

c) a universal joint coupled to the adjustable dampener;

d) an arm extending from the universal joint; and e) an attachment element with a bore therethrough, the arm releasably inserted into the bore; and f) the attachment element coupled to the lowermost frame of the bicycle.

19. The apparatus of claim 18, wherein the lower steering mechanism includes a clamp, the clamp having first and second opposing ends, the rod having first and second free ends, wherein the first and second opposing ends of the clamp are coupled to the first and second free ends of the rod, respectively.

20. The apparatus of claim 18, further including an adapter coupled the lower steering mechanism of the cycle, the adapter having first and second opposing ends, the rod having first and second free ends, wherein the first and second opposing ends of the adapter are coupled to the first and second free ends of the rod, respectively.

21. A dampener according to claim 18, wherein:

a) the adjustable dampener has an outer shell with first and second openings;

b) the first opening of the shell has a cap with a first hole;

c) the second opening of the shell has an adjustable nut with a second hole; and d) wherein the first and second holes form the passage of the adjustable dampener, wherein between the cap and adjustable nut is the dampening material to associate with the ring running through the passage, whereby adjusting the adjustable nut to compress the dampening material increases the friction between the dampening material and the ring.

22. A method of dampening the steering of a bicycle with a lower steering mechanism and a lowermost frame, comprising the steps of:

a) providing an arcuate rod coupled to the lower steering mechanism of the bicycle;
b) providing a dampener with an adjustable nut and a dampening material within the dampener with a passage, the arcuate rod running through the passage;
c) coupling the dampener to the lowermost frame of the bicycle; and
d) adjusting the adjustable nut to compress the dampening material to provide desired level of friction between the dampening material and the arcuate rod.

23. The method of claim 22, further including the steps of:
a) providing a universal joint to couple the dampener to the lowermost frame of the bicycle.

24. The method of claim 23, further including the steps of:
a) providing a connector to couple the universal joint to the lowermost frame of the bicycle.

25. A method of coupling a dampening assembly to a steering mechanism of a cycle, the cycle having a lower steering mechanism and a lowermost frame, the method comprising the steps of:
   coupling an arcuate rod to the lower steering mechanism of the cycle;
   running the arcuate rod through a passage in a dampening material located within a cartridge;
   radially compressing the dampening material; and
   coupling the cartridge to the lowermost frame of the cycle.

26. The method of claim 25, wherein the step of radially compressing the dampening material comprises radially and axially compressing the dampening material.

27. The method of claim 25, wherein the step of coupling the arcuate rod to the lower steering mechanism of the cycle comprises coupling an adapter to the lower steering mechanism that is adapted to couple to the arcuate rod.

28. A method of coupling a dampening assembly to a steering mechanism of a cycle, the cycle having a lower steering mechanism, a triple clamp and a lowermost frame, the method comprising the steps of:
   coupling an arcuate rod to the lower steering mechanism of the cycle;
   running the arcuate rod through a passage in a dampening material, the dampening material located within a cartridge;
   coupling the cartridge to the lowermost frame of the cycle; and
   replacing the triple clamp of the cycle with a triple clamp adapted to couple to the arcuate rod.

29. A method of coupling a dampening assembly to a steering mechanism of a cycle, the cycle having a lower steering mechanism and a lowermost frame, the method comprising the steps of:
   coupling an arcuate rod to the lower steering mechanism of the cycle;
   running the arcuate rod through a passage in a dampening material, the dampening material located within a cartridge;
   coupling the cartridge to the lowermost frame of the cycle;
   providing a universal joint to couple to the cartridge, wherein the universal joint has a pivot arm, and a connector with a port adapted to receive the pivot arm;
   inserting the pivot arm through the port of the connector; and
   coupling the connector to the lowermost frame of the cycle.

30. An apparatus, comprising:
   a cycle including a handlebar, a front wheel, a frame and a lower steering mechanism, coupled to the frame, that couples the handlebar to the front wheel;
   a cartridge having a passage and having a dampening material located within the passage, the dampening material having an axial length and having an opening through the axial length, the cartridge being configured to be coupled to the frame of the cycle and to impart a plurality of different compressive forces to the dampening material independent of lower steering mechanism position; and
   an arcuate rod adapted to couple to the lower steering mechanism of the cycle, and the arcuate rod passing through the opening of the dampening material within the cartridge to stabilize the steering mechanism.

31. The apparatus of claim 30, wherein the dampening material provides variable frictional resistance to the rod that is a function of the compressive force imparted by the cartridge.

32. The apparatus of claim 30, wherein the lower steering mechanism includes a clamp, the clamp having first and second opposing ends, the arcuate rod having first and second free ends, wherein the first and second opposing ends of the clamp are coupled to the first and second free ends of the arcuate rod, respectively.

33. The apparatus of claim 30, wherein the arc of the arcuate rod has a substantially semi-circular shape.

34. The apparatus of claim 33, wherein the arc of the arcuate rod has a predetermined radius, wherein twice of the predetermined radius is greater than the distance between the first and second opposing ends of the clamp.

35. The apparatus of claim 30, wherein the lower steering mechanism may be turned in an arc of substantially 180 degrees.

36. An apparatus, comprising:
   a cycle including a handlebar, a front wheel, a frame and a lower steering mechanism, coupled to the frame, that couples the handlebar to the front wheel;
   a cartridge having a passage and having a dampening material located within the passage, the dampening material having an axial length and having an opening through the axial length, wherein the cartridge is adapted to couple to the frame of the cycle;
   an arcuate rod adapted to couple to the lower steering mechanism of the cycle, and the arcuate rod passing through the opening of the dampening material within the cartridge to stabilize the steering mechanism;
   a cartridge holder having a ring area and a plate area, the ring area adapted to receive the cartridge, and the plate area having a slotted opening adapted to receive a dowel pin; and
   a frame holder having flanges adapted to couple to a lowermost frame of the cycle and pair of arms adapted to associate with the plate area of the cartridge holder, wherein each of the pair of arms have a hole adapted to receive the dowel pin through each of the holes in the pair of arms;
   whereby the cartridge holder is moveably coupled to the frame holder by positioning the plate area between the pair of arms and inserting the dowel pin through each of the hole in the pair arms and through the slotted opening in the plate area.

37. The apparatus of claim 36, wherein the plate area is substantially circular to form a relatively large surface area contact between the plate area and the two pair of arms.

38. An apparatus, comprising:
a cycle including a handlebar, a front wheel, a frame and a lower steering mechanism, coupled to the frame, that couples the handlebar to the front wheel;
a cartridge having a passage and having a dampening material located within the passage, the dampening material having an axial length and having an opening through the axial length, wherein the cartridge is adapted to couple to the frame of the cycle; and
an arcuate rod adapted to couple to the lower steering mechanism of the cycle, and the arcuate rod passing through the opening of the dampening material within the cartridge to stabilize the steering mechanism;
wherein the cartridge has an outer shell between a nozzle opening and a threaded opening adapted to receive the arcuate rod and an adjustable nut received by the threaded opening having an outer threaded end and a cone shaped opening and the nozzle opening, the threaded opening, and the cone shaped opening define the passage.

39. The apparatus of claim 38, wherein:
a) the cartridge and adjustable nut have a concave inner face to associate with the dampening material.

40. An apparatus, comprising:
a cycle including a handlebar, a front wheel, a frame and a lower steering mechanism, coupled to the frame, that couples the handlebar to the front wheel;
a cartridge made of Black Delrin material having a passage and having a dampening material located within the passage, the dampening material having an axial length and having an opening through the axial length, wherein the cartridge is adapted to couple to the frame of the cycle; and
an arcuate rod adapted to couple to the lower steering mechanism of the cycle, and the arcuate rod passing through the opening of the dampening material within the cartridge to stabilize the steering mechanism.

41. A lowermost steering mechanism for use with a cycle including a cycle frame, the lowermost steering mechanism comprising:
first and second forks;
a substantially arcuate rod, defining a size and a cross-sectional shape, operably connected to at least one of the first and second forks; and
a cartridge, adapted to be mounted adjacent to the cycle frame, including dampening material, the dampening material having an opening, defining a size and a cross-sectional shape, through which the arcuate rod passes;
the respective sizes and cross-sectional shapes of the arcuate rod and opening in the dampening material being such that the dampening material frictionally engages the arcuate rod and substantial movement of the arcuate rod will not substantially compress the dampening material.

42. A lowermost steering mechanism as claimed in claim 41, wherein the first and second forks respectively include first and second shock absorbers.

43. A lowermost steering mechanism as claimed in claim 41, wherein the first and second forks are connected to a clamp.

44. A lowermost steering mechanism as claimed in claim 43, wherein the arcuate rod is connected to the clamp.

45. A lowermost steering mechanism as claimed in claim 43, wherein the clamp comprises opposing ends defining a distance therebetween, the arc of the arcuate rod defines a radius, and twice the radius of the arc is greater than the distance between the opposing ends of the clamp.

46. A lowermost steering mechanism as claimed in claim 41, wherein the arcuate rod is operably connected to each of the first and second forks.

47. A lowermost steering mechanism as claimed in claim 41, wherein the arcuate rod comprises a semi-circular rod.

48. A lowermost steering mechanism as claimed in claim 41, wherein the dampening material opening defines a surface including contact areas that contact the arcuate rod and non-contact areas than do not contact the arcuate rod.

49. A lowermost steering mechanism as claimed in claim 48, wherein the ratio of contact areas to non-contact areas increases as pressure on the dampening material increases.

50. A lowermost steering mechanism as claimed in claim 41, wherein the cartridge substantially surrounds the dampening material.

51. A lowermost steering mechanism as claimed in claim 41, wherein the cartridge comprises first and second concave surfaces between which the dampening material is located.

52. A lowermost steering mechanism for use with a cycle including a cycle frame, the lowermost steering mechanism comprising:
first and second forks;
a substantially arcuate rod, defining a size and a cross-sectional shape, operably connected to at least one of the first and second forks;
a cartridge, adapted to be mounted adjacent to the cycle frame, including dampening material, the dampening material having an opening, defining a size and a cross-sectional shape, through which the arcuate rod passes, the respective sizes and cross-sectional shapes of the arcuate rod and opening in the dampening material being such that the dampening material frictionally engages the arcuate rod;
a universal joint, coupled to the cartridge, having a pivot arm; and
a connector, adapted to be coupled to the frame, defining a port for the pivot arm.

53. A lowermost steering mechanism for use with a cycle including a cycle frame, the lowermost steering mechanism comprising:
first and second forks;
a substantially arcuate rod, defining a size and a cross-sectional shape, operably connected to at least one of the first and second forks; and
a cartridge, adapted to be mounted adjacent to the cycle frame, including dampening material with a high-density cell structure, the dampening material having an opening, defining a size and a cross-sectional shape, through which the arcuate rod passes;
the respective sizes and cross-sectional shapes of the arcuate rod and opening in the dampening material being such that the dampening material frictionally engages the arcuate rod.

54. A lowermost steering mechanism for use with a cycle including a cycle frame, the lowermost steering mechanism comprising:
first and second forks;
a substantially arcuate rod, defining a size and a cross-sectional shape, operably connected to at least one of the first and second forks; and a cartridge, adapted to be mounted adjacent to the cycle frame, including urethane dampening material, the urethane dampening material having an opening, defining a size and a cross-sectional shape, through which the arcuate rod passes;

the respective sizes and cross-sectional shapes of the arcuate rod and opening in the urethane dampening material being such that the urethane dampening material frictionally engages the arcuate rod.

55. A lowermost steering mechanism for use with a cycle including a cycle frame, the lowermost steering mechanism comprising:

first and second forks;

a substantially arcuate rod, defining a size and a cross-sectional shape, operably connected to at least one of the first and second forks; and a cartridge adapted to be mounted adjacent to the cycle frame including dampening material, having an opening defining a size and a cross-sectional shape through which the arcuate rod passes, the respective sizes and cross-sectional shapes of the arcuate rod and opening in the dampening material being such that the dampening material frictionally engages the arcuate rod; and a user actuatable device that selectively increases and decreases pressure on the dampening material.

56. A lowermost steering mechanism for use with a cycle including a cycle frame, the lowermost steering mechanism comprising:

first and second forks;

a substantially arcuate rod, defining a size and a cross-sectional shape, operably connected to at least one of the first and second forks; and a cartridge, adapted to be mounted adjacent to the cycle frame, including first and second concave surfaces, at least one of the first and second concave surfaces being movable relative to the other, and dampening material located between the first and second concave surfaces, the dampening material having an opening, defining a size and a cross-sectional shape, through which the arcuate rod passes;

the respective sizes and cross-sectional shapes of the arcuate rod and opening in the dampening material being such that the dampening material frictionally engages the arcuate rod.

57. A lowermost steering mechanism for use with a cycle including a cycle frame, the lowermost steering mechanism comprising:

first and second forks rotatably movable together between a neutral position and at least one offset position rotatably offset from the neutral position;

a substantially arcuate rod, defining a size and a cross-sectional shape, operably connected to at least one of the first and second forks; and a dampening system that applies a dampening force to the arcuate rod that is substantially equal when the forks are in the neutral position and the at least one offset position, the dampening system including a cartridge adapted to be mounted adjacent to the cycle frame, and dampening material, within the cartridge, having an opening defining a size and a cross-sectional shape, through which the arcuate rod passes, the respective sizes and cross-sectional shapes of the arcuate rod and opening in the dampening material being such that the dampening material frictionally engages the arcuate rod.

58. A lowermost steering mechanism as claimed in claim 57, wherein the first and second forks are connected to a clamp.

59. A lowermost steering mechanism as claimed in claim 58, wherein the arcuate rod is connected to the clamp.

60. A lowermost steering mechanism as claimed in claim 57, wherein the dampening material comprises a material with a high-density cell structure.

61. A lowermost steering mechanism as claimed in claim 57, wherein the cartridge comprises a user actuatable device that selectively increases and decreases pressure on the dampening material.

* * * * *

UNITED STATES PATENT AND TRADEMARK OFFICE
CERTIFICATE OF CORRECTION

PATENT NO. : 6,471,229 B2
DATED : October 29, 2002
INVENTOR(S) : Gary L. Stewart It is certified that error appears in the above-identified patent and that said Letters Patent is hereby corrected as shown below:

Column 10,
Lines 14, 16, 17, 30, 32, 37 and 42, change "200" to -- 200a --.
Lines 15 and 18, change "202" to -- 202a -- and change "204" to -- 204a --.
Line 19, change "206" to -- 206a -- and change "208" to -- 208a --.
Line 20, change "206" to -- 206a -- and change "202" to -- 202a --.
Line 21, change "206" to -- 206a --.
Lines 22 and 33, change "210" to -- 210a --.
Line 23, change "206" to -- 206a -- and change "212" to -- 212a --.
Line 24, change "210" to -- 210a -- and change "212" to -- 212a --.
Lines 25 and 28, change "204" to -- 204a --.
Line 26, change "200" (both occurrences). to -- 200a --.
Line 27, change "208" to -- 208a --.
Lines 29, 35 and 39, change "202" to -- 202a --.
Line 31, change "210" to -- 210a -- and change "base 200" to -- base 204a -- and change "adapter 200" to -- adapter 200a --.
Line 36, change "214" to -- 214a --, change "216" to -- 216a -- and change "200" to -- 200a --.
Line 38, change "206" to -- 206a -- and change "204" to -- 204a --.
Line 40, change "216" to -- 216a --.
Line 43, change "214" to -- 214a -- and change "216" to -- 216a --.

Signed and Sealed this

Twenty-fifth Day of February, 2003

JAMES E. ROGAN
*Director of the United States Patent and Trademark Office*